(12) United States Patent
Raoufi

(10) Patent No.: US 11,865,495 B2
(45) Date of Patent: Jan. 9, 2024

(54) FILTERING PRODUCT

(71) Applicant: Arastou Raoufi, Mashhad (IR)

(72) Inventor: Arastou Raoufi, Mashhad (IR)

( * ) Notice: Subject to any disclaimer, the term of this patent is extended or adjusted under 35 U.S.C. 154(b) by 176 days.

(21) Appl. No.: 17/402,650

(22) Filed: Aug. 16, 2021

(65) Prior Publication Data

US 2021/0370229 A1 Dec. 2, 2021

Related U.S. Application Data

(63) Continuation-in-part of application No. PCT/IB2019/055727, filed on Jul. 4, 2019.

(30) Foreign Application Priority Data

Feb. 18, 2019 (IR) .................... 13975014000301009
Jul. 4, 2019 (WO) .................. PCT/IB2019/055727

(51) Int. Cl.
*B01D 53/14* (2006.01)
*B01D 53/78* (2006.01)
*A24F 1/30* (2006.01)

(52) U.S. Cl.
CPC ............ *B01D 53/1493* (2013.01); *A24F 1/30* (2013.01); *B01D 53/78* (2013.01); *B01D 2252/10* (2013.01); *B01D 2252/20* (2013.01); *B01D 2252/30* (2013.01); *B01D 2252/504* (2013.01)

(58) Field of Classification Search
CPC .... A24D 3/00; A24D 3/16; A24F 1/30; A24F 47/00; B01D 53/1493; B01D 53/78; B01D 2252/10; B01D 2252/20; B01D 2252/30; B01D 2252/504; B01D 37/00; B01D 39/14; B01D 39/20; B01J 39/00
See application file for complete search history.

(56) References Cited

U.S. PATENT DOCUMENTS

2013/0220349 A1 8/2013 Robertson

FOREIGN PATENT DOCUMENTS

| CN | 103 566 877 A | * | 2/2014 |
|---|---|---|---|
| IR | 13945014000300736 | | 12/2015 |
| IR | 13955014000300866 | | 10/2016 |
| WO | 2010146845 | | 12/2010 |
| WO | 2011071462 | | 6/2011 |

OTHER PUBLICATIONS

Moreno, Risks of Hookah Smoking, JAMA Pediatrics, Feb. 2015, pp. 196-196, vol. 169, No. 2.
Chiba, Toxic and trace elements in tobacco and tobacco smoke, 1992, pp. 1-33, Bulletin of the World Health Organization, vol. 70, No. 1.

(Continued)

*Primary Examiner* — Timothy C Vanoy
(74) *Attorney, Agent, or Firm* — Summit Patent Group

(57) ABSTRACT

In accordance with some embodiments herein, a filtering product is provided. The filtering product includes titanium dioxide (TiO2), cetyltrimethylammonium bromide (CTAB) and ascorbic acid (C6H8O6). The filtering product may be used for filtering smoke of a water pipe. Alternatively and/or additionally, the filtering product may be used for filtering gas.

17 Claims, 19 Drawing Sheets

Weight ratios compared to TiO₂

| | TiO₂ | CTAB | Ionic liquid | C₆H₈O₆ |
|---|---|---|---|---|
| Product 1 | 1 | 0.15 | 0 | 0.6667 |
| Product 2 | 1 | 0.15 | 0.2 | 0.6667 |
| Product 3 | 1 | 0.0526 | 0 | 1.0526 |
| Product 4 | 1 | 0.0526 | 0.2632 | 1.0526 |

(56) References Cited

OTHER PUBLICATIONS

Cerami, Tobacco smoke is a source of toxic reactive glycation products, National Academy of Sciences, 1997, pp. 13915-13920, vol. 94, No. 25.

Pappas, Toxic elements in tobacco and in cigarette smoke: inflammation and sensitization, Metallomics, Jul. 12, 2011, pp. 1181-1198, vol. 3, No. 11.

Chang, Biomarkers of tobacco exposure: summary of an FDA-sponsored public workshop, Cancer Epidemiology, Biomarkers & Prevention, 2017, pp. 291-302, vol. 26, No. 3.

Jeffery, Optimized method for determination of 16 FDA polycyclic aromatic hydrocarbons (PAHs) in mainstream cigarette smoke by gas chromatography-mass spectrometry, Chemistry Central Journal, 2018, pp. 1-13, vol. 12, Issue 1.

Hung, In vitro and in silico genetic toxicity screening of flavor compounds and other ingredients in tobacco products with emphasis on ENDS, Journal of Applied Toxicology, 2020, pp. 1566-1587, vol. 40, Issue 11.

Zhang, Evaluation of Tobacco Smoke and Diet as Sources of Exposure to Two Heterocyclic Aromatic Amines for the U.S. Population, Jan. 2020, pp. 103-111, vol. 29, No. 1.

Canales, Development of a green and efficient methodology for the heterocyclic aromatic amine determination in biomass samples generated from cigarette combustion and tobacco, Environmental Science and Pollution Research, Sep. 22, 2020, pp. 5205-5217, vol. 28, No. 5.

Haziza, Evaluation of the Tobacco Heating System 2.2. Part 8: 5-Day randomized reduced exposure clinical study in Poland, Regulatory Toxicology and Pharmacology, Nov. 3, 2016, pp. 139-150, vol. 81.

Maziak, Building the evidence base for waterpipe regulation and policy, Tobacco control, Nov. 25, 2019, pp. 59-61, vol. 29, No. 2.

Eddingsaas, Effect of user puffing topography on total particulate matter, nicotine and volatile carbonyl emissions from narghile waterpipes, Tobacco control, Aug. 12, 2019, pp. 117-122, vol. 22, No. 2, Rochester Institute of Technology, Rochester, New York, USA.

Elsayed, Chemical analysis and potential health risks of hookah charcoal, Science of the Total Environment, Jun. 15, 2016, pp. 262-268, vol. 569.

Gathuru, Review of hookah tobacco smoking among college students: policy implications and research recommendations, The American journal of drug and alcohol abuse, Jun. 9, 2015, pp. 272-280, vol. 41, Issue 4.

Cullen, Flavored tobacco product use among middle and high school students—United States 2014-2018, Morbidity and Mortality Weekly Report, Oct. 4, 2019, pp. 839-844, vol. 68, No. 39.

Middha, Forensic chemical profiling of flavouring additives in seized mu'assel (shisha) by gas chromatography-mass spectrometry (GC-MS), Egyptian Journal of Forensic Sciences, Jul. 13, 2019, pp. 1-13, vol. 9, Issue 1.

Rajabi, comparison of air-agitated liquid-liquid microextraction and ultrasound-assited emulsification microextraction for polycyclic aromatic hydrocarbons determination in hookah water, Journal of separation science, 2015, pp. 2496-2502, vol. 38, Issue14.

Bagheri, A single-step synthesized supehydrophobic melamine formaldehyde foam for trace determination of volatile organic pollutants, Journal of Chromatography, 2017, pp. 10-16.

Saadawi, Total Metal Analysis in Hookah Tobacco (Narghile, Shisha)—an Initial Study, Nov. 8, 2012, pp. 1-36, University of Cincinnati, Cincinnati, USA.

Badran, Waterpipe (shisha, hookah) smoking, oxidative stress and hidden disease potential, Redox Biology, 2020, pp. 1-7.

\* cited by examiner

102 →

| Weight ratios compared to TiO$_2$ |||||
|---|---|---|---|---|
| | TiO$_2$ | CTAB | Ionic liquid | C$_6$H$_8$O$_6$ |
| Product 1 | 1 | 0.15 | 0 | 0.6667 |
| Product 2 | 1 | 0.15 | 0.2 | 0.6667 |
| Product 3 | 1 | 0.0526 | 0 | 1.0526 |
| Product 4 | 1 | 0.0526 | 0.2632 | 1.0526 |

| Weight percentage (%) |||||
|---|---|---|---|---|
| | TiO$_2$ | CTAB | Ionic liquid | C$_6$H$_8$O$_6$ |
| Product 1 | 55.0459 | 8.2569 | 0 | 36.6972 |
| Product 2 | 49.5868 | 7.4380 | 9.9174 | 33.0578 |
| Product 3 | 47.5000 | 2.5000 | 0 | 50.0000 |
| Product 4 | 42.2222 | 2.2222 | 11.1111 | 44.4444 |

|  | Weight (mg) | | | |
|---|---|---|---|---|
|  | $TiO_2$ | CTAB | Ionic liquid | $C_6H_8O_6$ |
| Product 1 | 600 | 90 | 0 | 400 |
| Product 2 | 600 | 90 | 120 | 400 |
| Product 3 | 190 | 10 | 0 | 200 |
| Product 4 | 190 | 10 | 50 | 200 |

|  | $TiO_2$ (mg/L) | CTAB (mmol/L) | Ionic liquid (mmol/L) | $C_6H_8O_6$ (mmol/L) |
|---|---|---|---|---|
| Product 1 | 600 | 0.2469474 | 0 | 6.660894 |
| Product 2 | 600 | 0.2469474 | 0.422258 | 6.660894 |
| Product 3 | 190 | 0.0274386 | 0 | 3.330447 |
| Product 4 | 190 | 0.0274386 | 0.175941 | 3.330447 |

| | Weight ratios compared to TiO$_2$ | | | | | | |
|---|---|---|---|---|---|---|---|
| | TiO$_2$ | CTAB | Ionic liquid | C$_6$H$_8$O$_6$ | Na$_2$CO$_3$ | NaHCO$_3$ | C$_6$H$_8$O$_7$ |
| EF.Product 1 | 1 | 0.15 | 0 | 0.6667 | 5 | 0 | 2.5 |
| EF.Product 2 | 1 | 0.15 | 0 | 0.6667 | 0 | 5 | 2.5 |
| EF.Product 3 | 1 | 0.15 | 0 | 0.6667 | 2.5 | 2.5 | 2.5 |
| EF.Product 4 | 1 | 0.15 | 0 | 0.6667 | 7.3684 | 0 | 3.6842 |
| EF.Product 5 | 1 | 0.15 | 0 | 0.6667 | 0 | 7.3684 | 3.6842 |
| EF.Product 6 | 1 | 0.15 | 0 | 0.6667 | 3.6842 | 3.6842 | 3.6842 |
| EF.Product 7 | 1 | 0.15 | 0.2 | 0.6667 | 5 | 0 | 2.5 |
| EF.Product 8 | 1 | 0.15 | 0.2 | 0.6667 | 0 | 5 | 2.5 |
| EF.Product 9 | 1 | 0.15 | 0.2 | 0.6667 | 2.5 | 2.5 | 2.5 |
| EF.Product 10 | 1 | 0.15 | 0.2 | 0.6667 | 7.3684 | 0 | 3.6842 |
| EF.Product 11 | 1 | 0.15 | 0.2 | 0.6667 | 0 | 7.3684 | 3.6842 |
| EF.Product 12 | 1 | 0.15 | 0.2 | 0.6667 | 3.6842 | 3.6842 | 3.6842 |
| EF.Product 13 | 1 | 0.0526 | 0 | 1.0526 | 5 | 0 | 2.5 |
| EF.Product 14 | 1 | 0.0526 | 0 | 1.0526 | 0 | 5 | 2.5 |
| EF.Product 15 | 1 | 0.0526 | 0 | 1.0526 | 2.5 | 2.5 | 2.5 |
| EF.Product 16 | 1 | 0.0526 | 0 | 1.0526 | 7.3684 | 0 | 3.6842 |
| EF.Product 17 | 1 | 0.0526 | 0 | 1.0526 | 0 | 7.3684 | 3.6842 |
| EF.Product 18 | 1 | 0.0526 | 0 | 1.0526 | 3.6842 | 3.6842 | 3.6842 |
| EF.Product 19 | 1 | 0.0526 | 0.2632 | 1.0526 | 5 | 0 | 2.5 |
| EF.Product 20 | 1 | 0.0526 | 0.2632 | 1.0526 | 0 | 5 | 2.5 |
| EF.Product 21 | 1 | 0.0526 | 0.2632 | 1.0526 | 2.5 | 2.5 | 2.5 |
| EF.Product 22 | 1 | 0.0526 | 0.2632 | 1.0526 | 7.3684 | 0 | 3.6842 |
| EF.Product 23 | 1 | 0.0526 | 0.2632 | 1.0526 | 0 | 7.3684 | 3.6842 |
| EF.Product 24 | 1 | 0.0526 | 0.2632 | 1.0526 | 3.6842 | 3.6842 | 3.6842 |

|  | Weight (mg) | | | | | | |
|---|---|---|---|---|---|---|---|
|  | $TiO_2$ | CTAB | Ionic liquid | $C_6H_8O_6$ | $Na_2CO_3$ | $NaHCO_3$ | $C_6H_8O_7$ |
| EF.Product 1 | 600 | 90 | 0 | 400 | 3000 | 0 | 1500 |
| EF.Product 2 | 600 | 90 | 0 | 400 | 0 | 3000 | 1500 |
| EF.Product 3 | 600 | 90 | 0 | 400 | 1500 | 1500 | 1500 |
| EF.Product 4 | 600 | 90 | 0 | 400 | 4421 | 0 | 2211 |
| EF.Product 5 | 600 | 90 | 0 | 400 | 0 | 4421 | 2211 |
| EF.Product 6 | 600 | 90 | 0 | 400 | 2211 | 2211 | 2211 |
| EF.Product 7 | 600 | 90 | 120 | 400 | 3000 | 0 | 1500 |
| EF.Product 8 | 600 | 90 | 120 | 400 | 0 | 3000 | 1500 |
| EF.Product 9 | 600 | 90 | 120 | 400 | 1500 | 1500 | 1500 |
| EF.Product 10 | 600 | 90 | 120 | 400 | 4421 | 0 | 2211 |
| EF.Product 11 | 600 | 90 | 120 | 400 | 0 | 4421 | 2211 |
| EF.Product 12 | 600 | 90 | 120 | 400 | 2211 | 2211 | 2211 |
| EF.Product 13 | 190 | 10 | 0 | 200 | 950 | 0 | 475 |
| EF.Product 14 | 190 | 10 | 0 | 200 | 0 | 950 | 475 |
| EF.Product 15 | 190 | 10 | 0 | 200 | 475 | 475 | 475 |
| EF.Product 16 | 190 | 10 | 0 | 200 | 1400 | 0 | 700 |
| EF.Product 17 | 190 | 10 | 0 | 200 | 0 | 1400 | 700 |
| EF.Product 18 | 190 | 10 | 0 | 200 | 700 | 700 | 700 |
| EF.Product 19 | 190 | 10 | 50 | 200 | 950 | 0 | 475 |
| EF.Product 20 | 190 | 10 | 50 | 200 | 0 | 950 | 475 |
| EF.Product 21 | 190 | 10 | 50 | 200 | 475 | 475 | 475 |
| EF.Product 22 | 190 | 10 | 50 | 200 | 1400 | 0 | 700 |
| EF.Product 23 | 190 | 10 | 50 | 200 | 0 | 1400 | 700 |
| EF.Product 24 | 190 | 10 | 50 | 200 | 700 | 700 | 700 |

FIG. 1F

| | TiO$_2$ | CTAB | Ionic liquid | C$_6$H$_8$O$_6$ | Na$_2$CO$_3$ | NaHCO$_3$ | C$_6$H$_8$O$_7$ | PVP | PEG | glucose |
|---|---|---|---|---|---|---|---|---|---|---|
| EF.Tablet 1 | 1 | 0.15 | 0 | 0.6667 | 5 | 0 | 2.5 | 0.6 | 0.6 | 1.2 |
| EF.Tablet 2 | 1 | 0.15 | 0 | 0.6667 | 0 | 5 | 2.5 | 0.6 | 0.6 | 1.2 |
| EF.Tablet 3 | 1 | 0.15 | 0 | 0.6667 | 2.5 | 2.5 | 2.5 | 0.6 | 0.6 | 1.2 |
| EF.Tablet 4 | 1 | 0.15 | 0 | 0.6667 | 7.3684 | 0 | 3.6842 | 0.6 | 0.6 | 1.2 |
| EF.Tablet 5 | 1 | 0.15 | 0 | 0.6667 | 0 | 7.3684 | 3.6842 | 0.6 | 0.6 | 1.2 |
| EF.Tablet 6 | 1 | 0.15 | 0 | 0.6667 | 3.6842 | 3.6842 | 3.6842 | 0.6 | 0.6 | 1.2 |
| EF.Tablet 7 | 1 | 0.15 | 0 | 0.6667 | 5 | 0 | 2.5 | 0.2632 | 0.2632 | 0.5263 |
| EF.Tablet 8 | 1 | 0.15 | 0 | 0.6667 | 0 | 5 | 2.5 | 0.2632 | 0.2632 | 0.5263 |
| EF.Tablet 9 | 1 | 0.15 | 0 | 0.6667 | 2.5 | 2.5 | 2.5 | 0.2632 | 0.2632 | 0.5263 |
| EF.Tablet 10 | 1 | 0.15 | 0 | 0.6667 | 7.3684 | 0 | 3.6842 | 0.2632 | 0.2632 | 0.5263 |
| EF.Tablet 11 | 1 | 0.15 | 0 | 0.6667 | 0 | 7.3684 | 3.6842 | 0.2632 | 0.2632 | 0.5263 |
| EF.Tablet 12 | 1 | 0.15 | 0 | 0.6667 | 3.6842 | 3.6842 | 3.6842 | 0.2632 | 0.2632 | 0.5263 |
| EF.Tablet 13 | 1 | 0.15 | 0.2 | 0.6667 | 5 | 0 | 2.5 | 0.6 | 0.6 | 1.2 |
| EF.Tablet 14 | 1 | 0.15 | 0.2 | 0.6667 | 0 | 5 | 2.5 | 0.6 | 0.6 | 1.2 |
| EF.Tablet 15 | 1 | 0.15 | 0.2 | 0.6667 | 2.5 | 2.5 | 2.5 | 0.6 | 0.6 | 1.2 |
| EF.Tablet 16 | 1 | 0.15 | 0.2 | 0.6667 | 7.3684 | 0 | 3.6842 | 0.6 | 0.6 | 1.2 |
| EF.Tablet 17 | 1 | 0.15 | 0.2 | 0.6667 | 0 | 7.3684 | 3.6842 | 0.6 | 0.6 | 1.2 |
| EF.Tablet 18 | 1 | 0.15 | 0.2 | 0.6667 | 3.6842 | 3.6842 | 3.6842 | 0.6 | 0.6 | 1.2 |
| EF.Tablet 19 | 1 | 0.15 | 0.2 | 0.6667 | 5 | 0 | 2.5 | 0.2632 | 0.2632 | 0.5263 |
| EF.Tablet 20 | 1 | 0.15 | 0.2 | 0.6667 | 0 | 5 | 2.5 | 0.2632 | 0.2632 | 0.5263 |
| EF.Tablet 21 | 1 | 0.15 | 0.2 | 0.6667 | 2.5 | 2.5 | 2.5 | 0.2632 | 0.2632 | 0.5263 |
| EF.Tablet 22 | 1 | 0.15 | 0.2 | 0.6667 | 7.3684 | 0 | 3.6842 | 0.2632 | 0.2632 | 0.5263 |
| EF.Tablet 23 | 1 | 0.15 | 0.2 | 0.6667 | 0 | 7.3684 | 3.6842 | 0.2632 | 0.2632 | 0.5263 |
| EF.Tablet 24 | 1 | 0.15 | 0.2 | 0.6667 | 3.6842 | 3.6842 | 3.6842 | 0.2632 | 0.2632 | 0.5263 |

Weight ratios compared to TiO$_2$

FIG. 1G

| | TiO₂ | CTAB | Ionic liquid | C₆H₈O₆ | Na₂CO₃ | NaHCO₃ | C₆H₈O₇ | PVP | PEG | glucose |
|---|---|---|---|---|---|---|---|---|---|---|
| EF.Tablet 25 | 1 | 0.0526 | 0 | 1.0526 | 5 | 0 | 2.5 | 0.6 | 0.6 | 1.2 |
| EF.Tablet 26 | 1 | 0.0526 | 0 | 1.0526 | 0 | 5 | 2.5 | 0.6 | 0.6 | 1.2 |
| EF.Tablet 27 | 1 | 0.0526 | 0 | 1.0526 | 2.5 | 2.5 | 2.5 | 0.6 | 0.6 | 1.2 |
| EF.Tablet 28 | 1 | 0.0526 | 0 | 1.0526 | 7.3684 | 0 | 3.6842 | 0.6 | 0.6 | 1.2 |
| EF.Tablet 29 | 1 | 0.0526 | 0 | 1.0526 | 0 | 7.3684 | 3.6842 | 0.6 | 0.6 | 1.2 |
| EF.Tablet 30 | 1 | 0.0526 | 0 | 1.0526 | 3.6842 | 3.6842 | 3.6842 | 0.6 | 0.6 | 1.2 |
| EF.Tablet 31 | 1 | 0.0526 | 0 | 1.0526 | 5 | 0 | 2.5 | 0.2632 | 0.2632 | 0.5263 |
| EF.Tablet 32 | 1 | 0.0526 | 0 | 1.0526 | 0 | 5 | 2.5 | 0.2632 | 0.2632 | 0.5263 |
| EF.Tablet 33 | 1 | 0.0526 | 0 | 1.0526 | 2.5 | 2.5 | 2.5 | 0.2632 | 0.2632 | 0.5263 |
| EF.Tablet 34 | 1 | 0.0526 | 0 | 1.0526 | 7.3684 | 0 | 3.6842 | 0.2632 | 0.2632 | 0.5263 |
| EF.Tablet 35 | 1 | 0.0526 | 0 | 1.0526 | 0 | 7.3684 | 3.6842 | 0.2632 | 0.2632 | 0.5263 |
| EF.Tablet 36 | 1 | 0.0526 | 0 | 1.0526 | 3.6842 | 3.6842 | 3.6842 | 0.2632 | 0.2632 | 0.5263 |
| EF.Tablet 37 | 1 | 0.0526 | 0.2632 | 1.0526 | 5 | 0 | 2.5 | 0.6 | 0.6 | 1.2 |
| EF.Tablet 38 | 1 | 0.0526 | 0.2632 | 1.0526 | 0 | 5 | 2.5 | 0.6 | 0.6 | 1.2 |
| EF.Tablet 39 | 1 | 0.0526 | 0.2632 | 1.0526 | 2.5 | 2.5 | 2.5 | 0.6 | 0.6 | 1.2 |
| EF.Tablet 40 | 1 | 0.0526 | 0.2632 | 1.0526 | 7.3684 | 0 | 3.6842 | 0.6 | 0.6 | 1.2 |
| EF.Tablet 41 | 1 | 0.0526 | 0.2632 | 1.0526 | 0 | 7.3684 | 3.6842 | 0.6 | 0.6 | 1.2 |
| EF.Tablet 42 | 1 | 0.0526 | 0.2632 | 1.0526 | 3.6842 | 3.6842 | 3.6842 | 0.6 | 0.6 | 1.2 |
| EF.Tablet 43 | 1 | 0.0526 | 0.2632 | 1.0526 | 5 | 0 | 2.5 | 0.2632 | 0.2632 | 0.5263 |
| EF.Tablet 44 | 1 | 0.0526 | 0.2632 | 1.0526 | 0 | 5 | 2.5 | 0.2632 | 0.2632 | 0.5263 |
| EF.Tablet 45 | 1 | 0.0526 | 0.2632 | 1.0526 | 2.5 | 2.5 | 2.5 | 0.2632 | 0.2632 | 0.5263 |
| EF.Tablet 46 | 1 | 0.0526 | 0.2632 | 1.0526 | 7.3684 | 0 | 3.6842 | 0.2632 | 0.2632 | 0.5263 |
| EF.Tablet 47 | 1 | 0.0526 | 0.2632 | 1.0526 | 0 | 7.3684 | 3.6842 | 0.2632 | 0.2632 | 0.5263 |
| EF.Tablet 48 | 1 | 0.0526 | 0.2632 | 1.0526 | 3.6842 | 3.6842 | 3.6842 | 0.2632 | 0.2632 | 0.5263 |

Weight ratios compared to TiO₂

FIG. 1H

| | TiO₂ | CTAB | Ionic liquid | C₆H₈O₆ | Na₂CO₃ | NaHCO₃ | C₆H₈O₇ | PVP | PEG | glucose |
|---|---|---|---|---|---|---|---|---|---|---|
| | | | | | Weight (mg) | | | | | |
| EF.Tablet 1 | 600 | 90 | 0 | 400 | 3000 | 0 | 1500 | 360 | 360 | 720 |
| EF.Tablet 2 | 600 | 90 | 0 | 400 | 0 | 3000 | 1500 | 360 | 360 | 720 |
| EF.Tablet 3 | 600 | 90 | 0 | 400 | 1500 | 1500 | 1500 | 360 | 360 | 720 |
| EF.Tablet 4 | 600 | 90 | 0 | 400 | 4421 | 0 | 2211 | 360 | 360 | 720 |
| EF.Tablet 5 | 600 | 90 | 0 | 400 | 0 | 4421 | 2211 | 360 | 360 | 720 |
| EF.Tablet 6 | 600 | 90 | 0 | 400 | 2211 | 2211 | 2211 | 360 | 360 | 720 |
| EF.Tablet 7 | 600 | 90 | 0 | 400 | 3000 | 0 | 1500 | 158 | 158 | 316 |
| EF.Tablet 8 | 600 | 90 | 0 | 400 | 0 | 3000 | 1500 | 158 | 158 | 316 |
| EF.Tablet 9 | 600 | 90 | 0 | 400 | 1500 | 1500 | 1500 | 158 | 158 | 316 |
| EF.Tablet 10 | 600 | 90 | 0 | 400 | 4421 | 0 | 2211 | 158 | 158 | 316 |
| EF.Tablet 11 | 600 | 90 | 0 | 400 | 0 | 4421 | 2211 | 158 | 158 | 316 |
| EF.Tablet 12 | 600 | 90 | 0 | 400 | 2211 | 2211 | 2211 | 158 | 158 | 316 |
| EF.Tablet 13 | 600 | 90 | 120 | 400 | 3000 | 0 | 1500 | 360 | 360 | 720 |
| EF.Tablet 14 | 600 | 90 | 120 | 400 | 0 | 3000 | 1500 | 360 | 360 | 720 |
| EF.Tablet 15 | 600 | 90 | 120 | 400 | 1500 | 1500 | 1500 | 360 | 360 | 720 |
| EF.Tablet 16 | 600 | 90 | 120 | 400 | 4421 | 0 | 2211 | 360 | 360 | 720 |
| EF.Tablet 17 | 600 | 90 | 120 | 400 | 0 | 4421 | 2211 | 360 | 360 | 720 |
| EF.Tablet 18 | 600 | 90 | 120 | 400 | 2211 | 2211 | 2211 | 360 | 360 | 720 |
| EF.Tablet 19 | 600 | 90 | 120 | 400 | 3000 | 0 | 1500 | 158 | 158 | 316 |
| EF.Tablet 20 | 600 | 90 | 120 | 400 | 0 | 3000 | 1500 | 158 | 158 | 316 |
| EF.Tablet 21 | 600 | 90 | 120 | 400 | 1500 | 1500 | 1500 | 158 | 158 | 316 |
| EF.Tablet 22 | 600 | 90 | 120 | 400 | 4421 | 0 | 2211 | 158 | 158 | 316 |
| EF.Tablet 23 | 600 | 90 | 120 | 400 | 0 | 4421 | 2211 | 158 | 158 | 316 |
| EF.Tablet 24 | 600 | 90 | 120 | 400 | 2211 | 2211 | 2211 | 158 | 158 | 316 |

FIG. 11

| | TiO₂ | CTAB | Ionic liquid | C₆H₈O₆ | Na₂CO₃ | NaHCO₃ | C₆H₈O₇ | PVP | PEG | glucose |
|---|---|---|---|---|---|---|---|---|---|---|
| | | | | | Weight (mg) | | | | | |
| EF.Tablet 25 | 190 | 10 | 0 | 200 | 950 | 0 | 475 | 114 | 114 | 228 |
| EF.Tablet 26 | 190 | 10 | 0 | 200 | 0 | 950 | 475 | 114 | 114 | 228 |
| EF.Tablet 27 | 190 | 10 | 0 | 200 | 475 | 475 | 475 | 114 | 114 | 228 |
| EF.Tablet 28 | 190 | 10 | 0 | 200 | 1400 | 0 | 700 | 114 | 114 | 228 |
| EF.Tablet 29 | 190 | 10 | 0 | 200 | 0 | 1400 | 700 | 114 | 114 | 228 |
| EF.Tablet 30 | 190 | 10 | 0 | 200 | 700 | 700 | 700 | 114 | 114 | 228 |
| EF.Tablet 31 | 190 | 10 | 0 | 200 | 950 | 0 | 475 | 50 | 50 | 100 |
| EF.Tablet 32 | 190 | 10 | 0 | 200 | 0 | 950 | 475 | 50 | 50 | 100 |
| EF.Tablet 33 | 190 | 10 | 0 | 200 | 475 | 475 | 475 | 50 | 50 | 100 |
| EF.Tablet 34 | 190 | 10 | 0 | 200 | 1400 | 0 | 700 | 50 | 50 | 100 |
| EF.Tablet 35 | 190 | 10 | 0 | 200 | 0 | 1400 | 700 | 50 | 50 | 100 |
| EF.Tablet 36 | 190 | 10 | 0 | 200 | 700 | 700 | 700 | 50 | 50 | 100 |
| EF.Tablet 37 | 190 | 10 | 50 | 200 | 950 | 0 | 475 | 114 | 114 | 228 |
| EF.Tablet 38 | 190 | 10 | 50 | 200 | 0 | 950 | 475 | 114 | 114 | 228 |
| EF.Tablet 39 | 190 | 10 | 50 | 200 | 475 | 475 | 475 | 114 | 114 | 228 |
| EF.Tablet 40 | 190 | 10 | 50 | 200 | 1400 | 0 | 700 | 114 | 114 | 228 |
| EF.Tablet 41 | 190 | 10 | 50 | 200 | 0 | 1400 | 700 | 114 | 114 | 228 |
| EF.Tablet 42 | 190 | 10 | 50 | 200 | 700 | 700 | 700 | 114 | 114 | 228 |
| EF.Tablet 43 | 190 | 10 | 50 | 200 | 950 | 0 | 475 | 50 | 50 | 100 |
| EF.Tablet 44 | 190 | 10 | 50 | 200 | 0 | 950 | 475 | 50 | 50 | 100 |
| EF.Tablet 45 | 190 | 10 | 50 | 200 | 475 | 475 | 475 | 50 | 50 | 100 |
| EF.Tablet 46 | 190 | 10 | 50 | 200 | 1400 | 0 | 700 | 50 | 50 | 100 |
| EF.Tablet 47 | 190 | 10 | 50 | 200 | 0 | 1400 | 700 | 50 | 50 | 100 |
| EF.Tablet 48 | 190 | 10 | 50 | 200 | 700 | 700 | 700 | 50 | 50 | 100 |

FIG. 1J

| Metal Cation | E-Cigarette | Hookah | Filtered E-Cigarette | Filtered Hookah | LOQ | Unit | Method |
|---|---|---|---|---|---|---|---|
| Lead | 29.02 | 11.05 | 11.31 | 2.78 | 1.79 | µg.L$^{-1}$ | GF-AAS |
| Chromium | 17.30 | 0.21 | 6.80 | <LOQ | 0.20 | µg.L$^{-1}$ | GF-AAS |
| Cadmium | 238.77 | 28.00 | 21.39 | 3.40 | 0.44 | µg.L$^{-1}$ | GF-AAS |

FIG. 7

| Chemical Compound | $\bar{X}$(μg/Puff) | |
|---|---|---|
| | Hookah | Filtered Hookah |
| Nicotine (Free) | 32.49 | 27.72 |
| Pyridine | 19.07 | 1.54 |
| 1,3 butadiene | 24.33 | 1.33 |
| Benzo[a]pyrene | 31.33 | 0.01 |
| Formaldehyde | 30.97 | 0.04 |
| Crotonaldehyde | 54.44 | 0.12 |
| Acrolein | 34.36 | 0.21 |
| Acetaldehyde | 27.24 | 1.24 |
| Propylene oxide | 14.07 | 0.03 |
| Phenol | 15.48 | 0.06 |
| Benzen | 24.96 | 0.28 |

FIG. 8

FILTERING PRODUCT

RELATED APPLICATIONS

This application claims priority to and is a continuation-in-part of International Application Number PCT/IB2019/055727, filed on Jul. 4, 2019, entitled "AN EFFERVESCENT TABLET AS AN ABSORBENT OF TOXIC SUBSTANCES IN HOOKAH SMOKES", which claims priority to Iran Application Number 139750140003010091, filed on Feb. 18, 2019. International Application Number PCT/IB2019/055727 and Iran Application Number 139750140003010091 are incorporated herein by reference in their entirety.

BACKGROUND

Hookah and other tobacco products are widely enjoyed by users around the world. However, toxic chemical compounds and heavy metals in hookah smoke can adversely affect users' health over time. For example, the toxic chemical compounds and heavy metals can cause and/or contribute to cancer, breathing issues, etc.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1A presents a table of ratios associated with chemical compositions corresponding to a plurality of products, according to some embodiments.

FIG. 1B presents a table of weight percentage values associated with chemical compositions corresponding to a plurality of products, according to some embodiments.

FIG. 1C presents a table of weights associated with chemical compositions corresponding to a plurality of products, according to some embodiments.

FIG. 1D presents a table of properties associated with resulting mixtures formed using a plurality of products, according to some embodiments.

FIG. 1E presents a table of ratios associated with chemical compositions corresponding to a plurality of effervescent products, according to some embodiments.

FIG. 1F presents a table of weights associated with chemical compositions corresponding to a plurality of effervescent products, according to some embodiments.

FIGS. 1G-1H present a table of ratios associated with chemical compositions corresponding to a plurality of effervescent tablets, according to some embodiments.

FIGS. 1I-1J present a table of weights associated with chemical compositions corresponding to a plurality of effervescent tablets, according to some embodiments.

FIG. 7 presents a table of levels of heavy metals in smoke filtered using a filtering product and in smoke that is not filtered using a filtering product, according to some embodiments.

FIG. 8 presents a table of levels of chemical compounds in smoke filtered using a filtering product and in smoke that is not filtered using a filtering product, according to some embodiments.

DETAILED DESCRIPTION

Figure 2A:
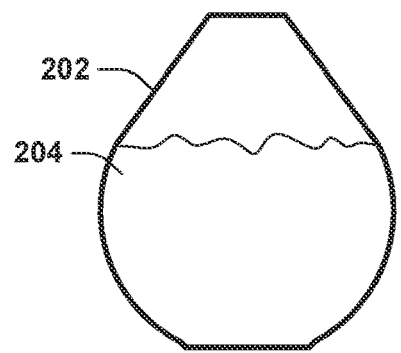
FIG. 2A is an illustration of an exemplary scenario in which a filtering product is used to filter smoke of a water pipe, wherein a chamber of the water pipe contains a liquid, according to some embodiments.

The following subject matter may be embodied in a variety of different forms, such as methods, compositions, materials, and/or systems. Accordingly, this subject matter is not intended to be construed as limited to any example embodiments set forth herein. Rather, example embodiments are provided merely to be illustrative.

All numerical values within the detailed description and the claims herein are modified by "about" or "approximately" the indicated value, and take into account experimental error and variations that would be expected by a person having ordinary skill in the art.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. Ranges from any lower limit to any upper limit are contemplated. The upper and lower limits of these smaller ranges which may independently be included in the smaller ranges is also encompassed within the disclosure, subject to any specifically excluded limit in the stated range. Where the stated range includes one or both of the limits, ranges excluding either both of those included limits are also included in the disclosure.

Although any methods and materials similar or equivalent to those described herein can also be used in the practice or testing of the present disclosure, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise.

Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

The present disclosure provides a filtering product (e.g., a non-effervescent filtering product and/or an effervescent filtering product such as an effervescent tablet, an effervescent powder and/or effervescent granules) for selective filtration of gas (e.g., air) and/or smoke of water pipes, such as hookahs. In an example of using the filtering product to filter smoke of a water pipe, a mixture may be formed using the product and a liquid (e.g., water). The mixture may be contained in a chamber, wherein smoke conducted through the chamber may be filtered by the mixture. For example, undesired substances (e.g., at least one of toxic chemicals, carcinogens, contaminants, impurities, heavy metals, etc.) of the smoke conducted through the chamber may be filtered, from the smoke, by the mixture (e.g., the undesired substances may be filtered from the smoke as the smoke bubbles through the mixture). Alternatively and/or additionally, one or more desired substances of the smoke, such as nicotine and/or one or more flavor chemicals (e.g., chemicals that carry a scent and/or flavor), may be retained in the filtered smoke (as a result of selective filtration of the mixture, for example). Accordingly, using the filtering product, a user of the water pipe may consume the one or more desired substances without consuming the undesired substances, thereby mitigating and/or avoiding negative health impacts associated with the undesired substances.

1. EXAMPLE PRODUCT COMPOSITIONS

The present disclosure provides example compositions of filtering products, such as non-effervescent filtering products and effervescent filtering products.

FIGS. 1A-1J illustrate tables of products and chemical compositions corresponding to the products. It may be appreciated that the products and chemical compositions provided in FIGS. 1A-1J are exemplary, and filtering products with different chemical compositions other than those shown in FIGS. 1A-1J are supported by the present disclosure.

In some examples, each value of one, some and/or all values of the tables in FIGS. 1A-1J may correspond to a range of values, wherein the range of values is one of: about 50% of the value to about 150% of the value, preferably about 70% of the value to about 130% of the value, more preferably about 80% of the value to about 120% of the value, even more preferably about 90% of the value to about 110% of the value, or especially preferred about 95% of the value to about 105% of the value.

FIG. 1A presents a table 102 of ratios associated with chemical compositions corresponding to a plurality of products. The plurality of products comprises Product 1, Product 2, Product 3 and Product 4. In some examples, one, some and/or all of the plurality of products may comprise one or more substances in addition to those shown in the table 102. In an example, a product of the plurality of products may comprise one or more effervescent agents (such as in an example in which the product is an effervescent product, such as an effervescent tablet, an effervescent powder and/or effervescent granules). Alternatively and/or additionally, a product of the plurality of products may not comprise one or more effervescent agents (such as in an example in which the product is a non-effervescent product). The table 102 shows ratios of weights of compounds cetyltrimethylammonium bromide (CTAB), ionic liquid and ascorbic acid ($C_6H_8O_6$) relative to an index weight of titanium dioxide ($TiO_2$). In some examples, the ionic liquid comprises 1-Butyl-3-methylimidazolium hexafluorophosphate (BMIM-$PF_6$). For example, the table 102 shows that in Product 1 of the plurality of products, a ratio of the CTAB to the titanium dioxide by weight is about 0.15:1 and a ratio of the ascorbic acid to the titanium dioxide by weight is about 0.667:1, wherein the Product 1 does not comprise ionic liquid. In other words, the table 102 shows that the CTAB is present in Product 1 at a weight that is about 0.15 times the weight of titanium dioxide, the ascorbic acid is present in Product 1 at a weight that is about 0.667 times the weight of titanium dioxide, and the Product 1 does not comprise ionic liquid.

FIG. 1B presents a table 104 of weight percentage values associated with chemical compositions corresponding to the plurality of products. In some examples, one, some and/or all of the plurality of products may comprise one or more substances in addition to those shown in the table 104. The table 104 shows weight percentage values of filtering agents (e.g., compounds that actively filter gas and/or smoke and/or that contribute to filtering gas and/or smoke). For example, the table 104 shows that in Product 1 of the plurality of products, the titanium dioxide is present at about 55.0459 weight % of filtering agents of Product 1, the CTAB is present at about 8.2569 weight % of filtering agents of Product 1, and the ascorbic acid is present at about 36.6972 weight % of filtering agents of Product 1, wherein the Product 1 does not comprise ionic liquid. Product 1 may comprise one or more non-filtering agents in addition to the filtering agents shown in the table 104 without affecting the weight percentages shown in the table 104 (since each weight percentage value of the table 104 may correspond to a weight percentage, of a filtering agent, with respect to filtering agents of a product). That is, regardless of whether or not a product of the plurality of products comprises non-filtering agents, the weight percentages of filtering agents of the product may add up to 100% in the table 104. It may be appreciated that embodiments are contemplated in which one or more products of the plurality of products comprise one or more other filtering agents other than those shown in the table 104.

FIG. 1C presents a table 106 of weights associated with chemical compositions corresponding to the plurality of products. In some examples, one, some and/or all of the plurality of products may comprise one or more substances in addition to those shown in the table 106. The table 106 shows weights (in units of milligrams) of titanium dioxide, CTAB, ionic liquid and/or ascorbic acid in each product of the plurality of products. For example, the table 106 shows that Product 1 comprises about 600 milligrams titanium dioxide, about 90 milligrams CTAB and about 400 milligrams ascorbic acid, wherein the Product 1 does not comprise ionic liquid. The weights shown in the table 106 may be for a defined amount of liquid (e.g., water) with which a corresponding product is to be mixed to form a mixture. In an example, the defined amount of liquid may be 1 liter (e.g., in an example in which a product of the plurality of products is mixed with water, the defined amount of liquid may correspond to 1 liter of water). Alternatively and/or additionally, the defined amount of liquid may be an amount other than 1 liter (e.g., 500 milliliters, 750 milliliters, 1250 milliliters, 1500 milliliters, or other amount). Thus, in an example in which the defined amount of liquid is 1 liter, and an amount of liquid with which a product of the plurality of products is to be mixed is 2 liters, weights of compounds of the product may be about 2 times the weights associated with the product shown in table 106.

FIG. 1D presents a table 108 of properties associated with resulting mixtures formed using the plurality of products. In some examples, one, some and/or all of the plurality of products and/or one, some and/or all of the resulting mixtures may comprise one or more substances in addition to those shown in the table 108. The table 108 is according to an embodiment in which the defined amount of liquid is 1 liter, and each product of the plurality of products comprises compounds with weights according to the table 106 of FIG. 1C. That is, the table 108 shows properties of a mixture formed by mixing each product of the plurality of products with 1 liter of liquid (e.g., water), respectively. It may be appreciated that in an embodiment in which the defined amount of liquid is different than 1 liter, properties of the resulting mixtures may be different than those shown in the table 108. For example, if the defined amount of liquid is about 500 milliliters, the resulting mixtures may have properties about two times those shown in the table 108. Mixture properties shown the table 108 may comprise a measure of titanium dioxide per liter (in units of milligrams per liter), a measure of CTAB per liter (in units of millimoles per liter), a measure of ionic liquid per liter (in units of millimoles per liter) and/or a measure of ascorbic acid per liter (in units of millimoles per liter). For example, the table 108 shows that mixing Product 1 with about 1 liter of liquid (e.g., about 1 liter of water) may yield a mixture with a titanium dioxide content of about 600 milligrams per liter, a CTAB content of about 0.247 millimoles per liter and/or an ascorbic acid content of about 6.661 millimoles per liter, wherein the mixture does not comprise ionic liquid.

FIG. 1E presents a table 110 of ratios associated with chemical compositions corresponding to a plurality of effervescent products. The plurality of effervescent products comprises EF.Products 1-24. In an example, an effervescent product of the plurality of effervescent products may be in the form of an effervescent tablet, an effervescent powder or effervescent granules. In some examples, an effervescent product of the plurality of effervescent products may comprise one or more filtering agents (e.g., titanium dioxide, CTAB, ascorbic acid and/or ionic liquid) according to amounts discussed with respect to the plurality of products. For example, (i) EF.Products 1-6 may comprise titanium dioxide, CTAB and/or ascorbic acid according to amounts discussed with respect to Product 1, (ii) EF.Products 7-12 may comprise titanium dioxide, CTAB, ionic liquid and/or ascorbic acid according to amounts discussed with respect to Product 2, (iii) EF.Products 13-18 may comprise titanium dioxide, CTAB and/or ascorbic acid according to amounts discussed with respect to Product 3, and/or (iv) EF.Products 19-24 may comprise titanium dioxide, CTAB, ionic liquid and/or ascorbic acid according to amounts discussed with respect to Product 4. In an example, an effervescent product of the plurality of effervescent products may comprise a product, of the plurality of products, comprising one or more effervescent agents. In some examples, one, some and/or all of the plurality of effervescent products may comprise one or more substances in addition to those shown in the table 110. The table 110 shows ratios of weights of compounds CTAB, ionic liquid and ascorbic acid relative to an index weight of titanium dioxide. The table 110 further shows ratios of weights of one or more effervescent agents relative to the index weight of titanium dioxide. The one or more effervescent agents may comprise sodium carbonate ($Na_2CO_3$), sodium bicarbonate ($NaHCO_3$) and/or citric acid ($C_6H_8O_7$). For example, the table 110 shows that in EF.Product 1 of the plurality of effervescent products, a ratio of the CTAB to the titanium dioxide by weight is about 0.15:1, a ratio of the ascorbic acid to the titanium dioxide by weight is about 0.667:1, a ratio of the sodium carbonate to the titanium dioxide by weight is about 5:1 and/or a ratio of the citric acid to the titanium dioxide by weight is about 2.5:1, wherein the EF.Product 1 does not comprise ionic liquid and/or sodium bicarbonate.

FIG. 1F presents a table 112 of weights associated with chemical compositions corresponding to the plurality of effervescent products. In some examples, one, some and/or all of the plurality of effervescent products may comprise one or more substances in addition to those shown in the table 112. The table 112 shows weights (in units of milligrams) of titanium dioxide, CTAB, ionic liquid, ascorbic acid and/or one or more effervescent agents (e.g., sodium carbonate, sodium bicarbonate and/or citric acid) in each effervescent product of the plurality of effervescent products. The weights shown in the table 112 may be for a defined amount of liquid (e.g., water) with which a corresponding effervescent product is to be mixed to form a mixture (e.g., the corresponding effervescent product may be dissolved in the defined amount of liquid to form the mixture). In an example, the defined amount of liquid may be 1 liter. Alternatively and/or additionally, the defined amount of liquid may be an amount other than 1 liter (e.g., 500 milliliters, 750 milliliters, 1250 milliliters, 1500 milliliters, or other amount).

FIGS. 1G-1H present a table 114 of ratios associated with chemical compositions corresponding to a plurality of effervescent tablets. The plurality of effervescent tablets comprises EF.Tablets 1-48. In an example, an effervescent tablet of the plurality of effervescent tablets may be in the form of an effervescent tablet, an effervescent powder or effervescent granules. In some examples, an effervescent tablet of the plurality of effervescent tablets may comprise one or more filtering agents (e.g., titanium dioxide, CTAB, ascorbic acid and/or ionic liquid) according to amounts discussed with respect to the plurality of products. For example, (i) EF.Tablets 1-12 may comprise titanium dioxide, CTAB and/or ascorbic acid according to amounts discussed with respect to Product 1, (ii) EF.Tablets 13-24 may comprise titanium dioxide, CTAB, ionic liquid and/or ascorbic acid according to amounts discussed with respect to Product 2, (iii) EF.Tablets 25-36 may comprise titanium dioxide, CTAB and/or ascorbic acid according to amounts discussed with respect to Product 3, and/or (iv) EF.Tablets 37-48 may comprise titanium dioxide, CTAB, ionic liquid and/or ascorbic acid according to amounts discussed with respect to Product 4. In an example, an effervescent tablet of the plurality of effervescent tablets may comprise a product, of the plurality of products, comprising one or more effervescent agents and/or one or more binders. In some examples, one, some and/or all of the plurality of effervescent tablets may comprise one or more substances in addition to those shown in the table 114. The table 114 shows ratios of weights of compounds CTAB, ionic liquid and ascorbic acid relative to an index weight of titanium dioxide. The table 114 further shows ratios of weights of one or more effervescent agents relative to the index weight of titanium dioxide. The one or more effervescent agents may comprise sodium carbonate, sodium bicarbonate and/or citric acid. The table 114 further shows ratios of weights of one or more binders relative to the index weight of titanium dioxide. The one or more binders may comprise polyvinylpyrrolidone (PVP), polyethylene glycol (PEG) and/or glucose (e.g., liquid glucose). For example, the table 114 shows that in EF.Tablet 1 of the plurality of effervescent tablets, a ratio of the CTAB to the titanium dioxide by weight is about 0.15:1, a ratio of the ascorbic acid to the titanium dioxide by weight is about 0.667:1, a ratio of the sodium carbonate to the titanium dioxide by weight is about 5:1, a ratio of the citric acid to the titanium dioxide by weight is about 2.5:1, a ratio of the PVP to the titanium dioxide by weight is about 0.6:1, a ratio of the PEG to the titanium dioxide by weight is about 0.6:1, and/or a ratio of the glucose to the titanium dioxide by weight is about 1.2:1, wherein the EF.Tablet 1 does not comprise ionic liquid and/or sodium bicarbonate.

FIGS. 1I-1J presents a table 116 of weights associated with chemical compositions corresponding to the plurality of effervescent tablets. In some examples, one, some and/or all of the plurality of effervescent tablets may comprise one or more substances in addition to those shown in the table 116. The table 116 shows weights (in units of milligrams) of titanium dioxide, CTAB, ionic liquid, ascorbic acid, one or more effervescent agents (e.g., sodium carbonate, sodium bicarbonate and/or citric acid) and/or one or more binders (e.g., PVP, PEG and/or glucose) in each effervescent tablet of the plurality of effervescent tablets. The weights shown in the table 116 may be for a defined amount of liquid (e.g., water) with which a corresponding effervescent tablet is to be mixed to form a mixture (e.g., the corresponding effervescent tablet may be dissolved in the defined amount of liquid to form the mixture). In an example, the defined amount of liquid may be 1 liter. Alternatively and/or additionally, the defined amount of liquid may be an amount other than 1 liter (e.g., 500 milliliters, 750 milliliters, 1250 milliliters, 1500 milliliters, or other amount).

2. TABLET PRODUCTION

A process for forming an effervescent filtering tablet is provided. In an example, tablet ingredients may be prepared, wherein the tablet ingredients comprise one or more filtering agents (e.g., titanium dioxide, CTAB, ascorbic acid and/or ionic liquid), one or more effervescent agents (e.g., sodium carbonate, sodium bicarbonate and/or citric acid) and/or one or more binders (e.g., PVP, PEG and/or glucose). The one or more binders may be used to support the mechanical integrity of the effervescent filtering tablet. In an example, the tablet ingredients may be prepared in accordance with a composition of the tables of FIGS. 1A-1J. Alternatively and/or additionally, a composition of the tablet ingredients may differ from compositions of the tables of FIGS. 1A-1J. First tablet ingredients, of the tablet ingredients, may be ground to diminish powder agglomerations. Second tablet ingredients (comprising the ground first tablet ingredients, for example) may be mixed to produce a powder. For example, the second tablet ingredients may be mixed using a powder mixer (e.g., at least one of a tumbler blender, a ribbon blender, etc.). Alternatively and/or additionally, in an example in which one or more third tablet ingredients (e.g., PVP, PEG, glucose, ionic liquid, etc.) of the tablet ingredients are liquid and/or in the form of aqueous solutions, the one or more third tablet ingredients may be mixed with the powder (using a paddle mixer, for example) to obtain granules (e.g., wet granules). The granules may be dried (using an air circulating oven, for example). The granules may be compressed to form one or more effervescent filtering tablets. In an example, a die of a tablet manufacturing machine may be filled with a predefined amount (e.g., a predefined weight or volume) of the granules (e.g., dry granules). The tablet manufacturing machine may operate to compress the granules (e.g., the granules may be compressed uniaxially, such as by lowering an upper punch inside the die) to form an effervescent filtering tablet. The effervescent filtering tablet may be ejected from the die. In some examples, the effervescent filtering tablet may be produced using one or more tablet production techniques other than those provided herein.

3. EXAMPLE SCENARIOS

3.1 Water Pipe Filtering Example Scenario 1

Figure 2B:
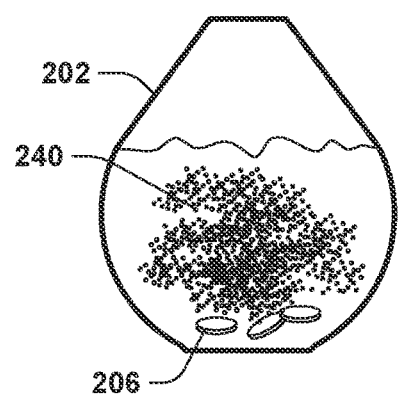
FIG. 2B is an illustration of an exemplary scenario in which a filtering product is used to filter smoke of a water pipe, wherein a mixture is formed using the filtering product and a liquid, according to some embodiments.

FIGS. 2A-2E illustrate an example scenario 200 in which a filtering product (e.g., a non-effervescent filtering product or an effervescent filtering product such as an effervescent tablet, an effervescent powder and/or effervescent granules) is used to filter smoke of a water pipe, such as hookah 250. In FIG. 2A, a chamber of the hookah 250, such as hookah base 202, may be filled (e.g., partially filled or fully filled) with liquid 204 (e.g., water). For example, a desired amount of liquid 204 may be poured into the hookah base 202. In FIG. 2B, a mixture 240 may be formed using a filtering product 206 and the liquid 204. In some examples, the mixture 240 comprises a solution. In an example, the filtering product 206 may comprise one or more filtering agents (e.g., titanium dioxide, CTAB, ascorbic acid and/or ionic liquid), one or more effervescent agents (e.g., sodium carbonate, sodium bicarbonate and/or citric acid) and/or one or more binders (e.g., PVP, PEG and/or glucose). A composition of the filtering product 206 may be in accordance with one or more filtering product embodiments of the present disclosure. In an example, the filtering product 206 may be prepared according to a composition of the tables of FIGS. 1A-1J. Alternatively and/or additionally, a composition of the filtering product 206 may differ from compositions of the tables of FIGS. 1A-1J.

As shown in FIG. 2B, the base 202 may contain the mixture 240. In some examples, one or more substances other than the mixture 240, the liquid 204 and/or the filtering product 206 may be contained in the base 202.

In some examples, one or more components (e.g., titanium dioxide nanoparticles, CTAB, ionic liquid and/or ascorbic acid) of the filtering product 206 may be dispersed (e.g., scattered and/or mixed throughout the mixture 240, for example) as a result of smoke of the hookah 250 bubbling through the mixture 240 (discussed below). For example, the smoke bubbling through the mixture 240 may assist in (e.g., increase and/or enhance) dispersion of the one or more components and/or forming the mixture 240.

In an example, the mixture 240 may be formed by mixing the filtering product 206 in the liquid 204 (e.g., the mixing may be at least one of via creating a mixing flow in the liquid 204, via the smoke bubbling through the mixture 240, via manually mixing the filtering product 206, via shaking the base 202, via rotating the base 202, etc.).

In an example in which the filtering product 206 is an effervescent filtering product (e.g., an effervescent tablet, an effervescent powder and/or effervescent granules), the mixture 240 may be formed by placing the filtering product 206 in the base 202 (e.g., in the liquid 204), wherein the filtering product 206 may be dispersed (and/or may disintegrate and/or dissolve) in the liquid 204 by reactions of one or more effervescent agents in the filtering product 206.

For example, the filtering product 206 may comprise one or more effervescent agents, such as one or more acids and one or more bases. The liquid 204 (e.g., water) may liberate the one or more acids and the one or more bases and/or enables the one or more acids and the one or more bases to react with each other to produce a gas (e.g., carbon dioxide ($CO_2$)).

In an example in which the one or more acids comprise citric acid and the one or more bases comprise sodium carbonate and/or sodium bicarbonate, the citric acid of the filtering product 206 may dissociate to produce protons, such as according to:

$$C_6H_8O_7 + H_2O => [C_6H_8O_7]^{3-} + 3[H]^+$$

Alternatively and/or additionally, the sodium carbonate and/or the sodium bicarbonate may decompose (in the presence of the liquid 204, such as water) to constituting anions and cations, such as according to:

$$Na_2CO_3 => [CO_3]^{2-} + 2[Na]^+$$

$$NaHCO_3 => [HCO_3]^- + [Na]^+$$

In some examples, disassociated citric acid, decomposed sodium carbonate and/or decomposed sodium bicarbonate may react with each other to produce carbon dioxide, such as according to:

$$2[C_6H_8O_7]^{3-} + 6H^{3O} + 3Na_2CO_3 => 3H_2O + 3CO_2 + 6[Na]^+ \cdot 2[C_6H_8O_7]^{3-}$$

$$[C_6H_8O_7]^{3-} + 3H^+ + 3NaHCO_3 => 3H_2O + 3CO_2 + 3[Na]^+ \cdot [C_6H_8O_7]^{3-}$$

In some examples, the one or more acids of the one or more effervescent agents may comprise one or more other acids, such as at least one of aspartic acid, malic acid, adipic acid, tartaric acid, fumaric acid, succinic acid, sodium acid pyrophosphate, lactic acid, hexamic acid, amino acid hydrochlorides, acid salts, acid anhydrides, etc. For example, the one or more other acids may be in addition to the citric acid (e.g., such that the one or more acids comprise the one or more other acids and the citric acid). Alternatively and/or additionally, the one or more other acids may be in place of the citric acid (e.g., such that the one or more acids comprise the one or more other acids but do not comprise the citric acid).

In some examples, the one or more bases of the one or more effervescent agents may comprise one or more other bases, such as at least one of potassium bicarbonate, sodium sesquicarbonate, potassium carbonate, calcium carbonate, magnesium carbonate, zinc carbonate, etc. For example, the one or more other bases may be in addition to the sodium carbonate and/or the sodium bicarbonate (e.g., such that the one or more bases comprise the one or more other bases and the sodium carbonate and/or the sodium bicarbonate). Alternatively and/or additionally, the one or more other bases may be in place of the sodium carbonate and/or the sodium bicarbonate (e.g., such that the one or more bases comprise the one or more other bases but do not comprise the sodium carbonate and/or the sodium bicarbonate).

The gas (e.g., carbon dioxide) produced by the one or more effervescent agents in the liquid 204 may form gas bubbles (and/or may travel via the gas bubbles) in the liquid 204. In some examples, one or more components (e.g., titanium dioxide nanoparticles, CTAB, ionic liquid and/or ascorbic acid) of the filtering product 206 may be dispersed (e.g., scattered and/or mixed throughout the mixture 240, for example) as a result of the gas bubbles. For example, the gas bubbles may assist in (e.g., increase and/or enhance) dispersion of the one or more components to form the mixture 240.

Figure 2C:
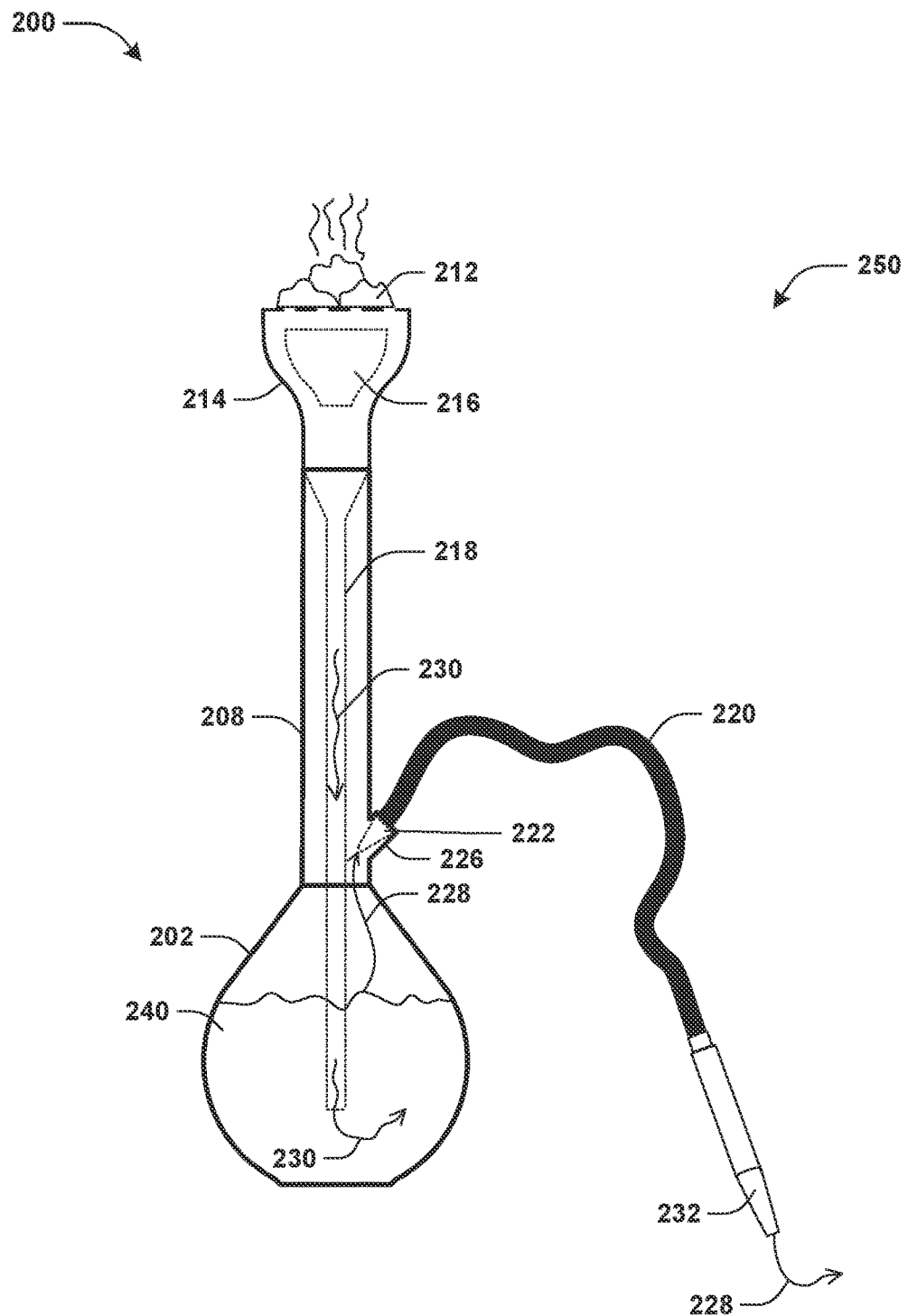
FIG. 2C is an illustration of an exemplary scenario in which a filtering product is used to filter smoke of a water pipe, wherein the water pipe is utilized, according to some embodiments.

FIG. 2C illustrates utilization of the hookah 250. The hookah 250 may comprise a bowl 214 and a hookah stem 218. The bowl 214 may be coupled to the hookah stem 218. The hookah 250 may comprise a port 226 into which a male hose fitting 222 is fit. Tobacco 216 (e.g., flavored tobacco) may be placed in the bowl 214 and the top of the bowl 214 may be covered with a screen and coals 212. The coals 212 may be heated (to the point of burning, for example), and the coals 212 may transfer heat across the screen and burn the tobacco 216. A user may place a mouthpiece 232 to the user's mouth and may draw a breath through the mouthpiece 232. The breath may create vacuum pressure within a hookah hose 220, the port 226, and the base 202. The vacuum pressure draws smoke 230 from the smoldering tobacco 216, through one or more holes (not shown) in the bottom of the bowl 214, through the hookah stem 218 that extends into the mixture 240 in the hookah base 202. As the smoke 230 arrives at the bottom of the hookah stem 218, the smoke 230 is conducted through the base 202 and the smoke 230 bubbles through the mixture 240. The mixture 240 filters the smoke 230 to produce filtered smoke 228. The filtered smoke 228 may be collected within the base 202 and/or flows from the base 202 through the port 226, through the hose 220, out of the mouthpiece 232, and/or into the user's mouth and/or lungs.

In some examples, the mixture 240 may filter at least one of toxic chemicals, carcinogens, contaminants, impurities, undesired substances, heavy metals, etc. from the smoke 230 to produce the filtered smoke 228. For example, at least one of the toxic chemicals, the contaminants, the impurities, the undesired substances, the heavy metals, etc. of the smoke 230 may be filtered from the smoke 230 as the smoke 230 bubbles through the mixture 240.

In an example, the mixture 240 may filter one or more chemical compounds (e.g., at least one of one or more organic compounds, one or more nitrogenous compounds, one or more aromatic compounds, one or more cyclic compounds, one or more heterocyclic compounds, one or more amines, one or more carcinogenic compounds, one or more mono-aromatic hydrocarbons, one or more poly-aromatic hydrocarbons, one or more unsaturated aliphatic hydrocarbons, one or more aliphatic amines, one or more aromatic amines, one or more carbonyl compounds, etc.) from the smoke 230, wherein the one or more chemical compounds may comprise at least one of Pyridine, Phenol, Benzene, Propylene oxide, Benzopyrene, one or more cyanides, p-Phenylbenzonitrile, Benzonitrile, 2-(2-pyridinyl), Benzenemethanamine n-Phenyl, Triphenylene, etc. In an example, the mixture 240 may absorb at least some of the one or more chemical compounds. Alternatively and/or additionally, at least some of the one or more chemical compounds may be eliminated by the mixture 240 (e.g., using titanium dioxide nanoparticles, CTAB and/or ionic liquid in the mixture 240) via a synthetic reaction (e.g., a high-speed synthetic reaction). In some examples, the one or more chemical compounds may be filtered from the smoke 230 using titanium dioxide nanoparticles in the mixture 240, CTAB in the mixture 240 and/or ionic liquid in the mixture 240. In an example, the CTAB and/or the ionic liquid may act as catalysts to assist (e.g., increase, facilitate and/or enhance) filtering of the one or more chemical compounds from the smoke 230 using the titanium dioxide nanoparticles, wherein the titanium dioxide nanoparticles may act as an aromatic sorbent.

In some examples, titanium dioxide nanoparticles in the mixture 240 may be stabilized using CTAB in the mixture 240. In an example shown in FIG. 2D, one or more titanium dioxide nanoparticles 252 may be located at the interface 248 of the mixture 240 and a bubble 260 of the smoke 230. In some examples, polar heads of CTAB molecules 254 may be adsorbed onto surfaces of the titanium dioxide nanoparticles 252. Alternatively and/or additionally, CTAB molecules 254 may form a micelle 256 (e.g., a cationic micelle and/or a double-layer coating of CTAB molecules 254) around a titanium dioxide nanoparticle 252. In an example, the micelle 256 may comprise CTAB molecules 256 with polar heads toward the titanium dioxide nanoparticle 252 and CTAB molecules 256 with polar heads away from the titanium dioxide nanoparticle 252 (e.g., the polar heads away from the titanium dioxide nanoparticle 252 may be at an interface 258 of the micelle 256). Alternatively and/or additionally, CTAB molecules 254 may form chains (e.g., long chain). In some examples, CTAB molecules 254 may inhibit and/or mitigate sedimentation of titanium dioxide nanoparticles 252 and/or may enhance (e.g., increase) an effective surface area of titanium dioxide nanoparticles 252.

In some examples, at least some of the one or more chemical compounds may be trapped in the mixture 240, adsorbed, degraded, absorbed, and/or converted using at least one of CTAB molecules 254, micelles 256, chains of CTAB molecules 254 and/or titanium dioxide nanoparticles 252. In some examples, the ionic liquid may assist (e.g., increase, facilitate and/or enhance) degradation of at least some of the one or more chemical compounds. For example, the ionic liquid may assist (e.g., increase, facilitate and/or enhance) degradation of one or more aromatic compounds by assisting (e.g., increasing, facilitating and/or enhancing) interactions between titanium dioxide nanoparticles 252 and aromatic compounds, and/or by assisting (e.g., increasing, facilitating and/or enhancing) adsorption of aromatic gases on surfaces of titanium dioxide nanoparticles 252.

In some examples, at least some of the one or more chemical compounds are adsorbed on surfaces of titanium dioxide nanoparticles 252 in the mixture 240 (such as during movement of the bubbles of the smoke 230 in the mixture 240).

In some examples, at least some of the one or more chemical compounds are adsorbed on interfaces of micelles 256 around titanium dioxide nanoparticles 252 in the mixture 240 (such as during movement of the bubbles of the smoke 230 in the mixture 240).

In some examples, at least some of the one or more chemical compounds are partially dissolved in the mixture 240 and are subsequently adsorbed on surfaces of titanium dioxide nanoparticles 252 in the mixture 240 (such as during movement of the bubbles of the smoke 230 in the mixture 240).

In some examples, at least some of the one or more chemical compounds are partially dissolved in the mixture 240 and are subsequently adsorbed on interfaces of micelles 256 around titanium dioxide nanoparticles 252 in the mixture 240 (such as during movement of the bubbles of the smoke 230 in the mixture 240).

In some examples, ionic liquid in the mixture 240 may assist (e.g., increase, facilitate and/or enhance) adsorption of at least some of the one or more chemical compounds on surfaces of titanium dioxide nanoparticles 252 (such as during movement of the bubbles of the smoke 230 in the mixture 240).

In some examples, ionic liquid in the mixture 240 may assist (e.g., increase, facilitate and/or enhance) adsorption of at least some of the one or more chemical compounds on interfaces of micelles 256 around titanium dioxide nanoparticles 252 (such as during movement of the bubbles of the smoke 230 in the mixture 240).

In some examples, chemical compounds, of the one or more chemical compounds, that are adsorbed on titanium dioxide nanoparticles 252 (and/or adsorbed on interfaces of micelles 256 around titanium dioxide nanoparticles 252) may be converted to non-toxic compounds and/or water soluble compounds (via a photocatalytic reaction, such as a photocatalytic oxidation reaction, for example). In an example, the one or more chemical compounds may comprise benzene, which may be converted to carbon dioxide (via a photocatalytic oxidation reaction, for example), wherein the carbon dioxide may leave the reaction media.

In an example, the mixture 240 may filter one or more heavy metals from the smoke 230, wherein the one or more heavy metals may comprise at least one of mercury, lead, cadmium, chromium, etc. In some examples, the mixture 240 may absorb at least some of the one or more heavy metals. In some examples, the one or more heavy metals may be filtered from the smoke 230 using ascorbic acid in the mixture 240. In some examples, at least some of the one or more heavy metals may be trapped in the mixture 240 and/or converted using the ascorbic acid.

In some examples, at least some heavy metals of the one or more heavy metals may react with the ascorbic acid to form a complex structure of heavy metals and ascorbic acid, wherein the complex structure may be water-soluble and/or may sediment. In an example, the complex structure may be a metal-organic ligand complex (e.g., water-soluble metal-organic ligand complex). For example, in FIG. 2E, diagram 270 exhibits the molecular structure of ascorbic acid and diagram 272 exhibits a metal-organic ligand complex around a metal molecule (e.g., a heavy metal molecule of the one or more heavy metals). In an example, one or more ascorbic acid molecules may interact with a metal molecule (e.g., a heavy metal molecule of the one or more heavy metals) to form a metal-organic ligand complex (such as shown in diagram 272). The metal-organic ligand complex may be water-soluble (and/or may be soluble in the liquid 204). Alternatively and/or additionally, the metal-organic ligand complex may sediment. Accordingly, the filtered smoke 228 may not comprise the metal molecule (and/or the metal-organic ligand complex).

Thus, in accordance with one or more embodiments herein, using the filtering product 206 and/or the mixture 240 to filter the smoke 230 may lead to benefits including producing the filtered smoke 228 having a reduced amount of at least one of toxic chemicals, carcinogens, contaminants, impurities, undesired substances, heavy metals, etc., thus mitigating negative impact on the user's health. For example, at least some substances that are filtered from the smoke 230 using the filtering product 206 and/or the mixture 240 may cause (and/or may be contributors to) health issues such as at least one of cancer (e., blood cancer, lung cancer, etc.), breathing issues, lung damage, liver damage, kidney damage, gonad damage, sterility, infertility, etc. By using the filtering product 206 and/or the mixture 240 in accordance with one or more of the techniques herein, a user may utilize a water pipe without contributing to the development of such health issues (and/or contributing less to the development of such health issues). Alternatively and/or additionally, one or more desired components of the smoke 230 may be allowed to pass through the mixture 240 (e.g., due to selective filtration of the filtering product 206 and/or the mixture 204). For example, the one or more desired components may not be filtered (and/or may be minimally filtered, such as filtered at a rate less than other components of the smoke 230 are filtered) by the filtering product 206 and/or the mixture 204. In an example, the one or more desired components of the smoke 230 may comprise nicotine and/or one or more flavor chemicals. The one or more flavor chemicals may comprise chemical compounds that carry a scent and/or a flavor, such as a scent and/or a flavor of the tobacco 216 (e.g., the one or more flavor chemicals may comprise limonene, such as in an example in which the tobacco 216 is fruit-flavored tobacco). Thus, by using the filtering product 206 and/or the mixture 240 in accordance with one or more of the techniques herein, a user may enjoy desired aspects (e.g., nicotine and/or tobacco flavor) of a water pipe experience (without contributing to negative health impacts, for example).

Some filters that are used for filtering hookahs are solid objects that require physically attaching the filter to a hookah. Such filters may increase an amount of pressure required to draw smoke from the hookah. Thus, using such filters, the user may inhale with increased pressure, which may cause discomfort and/or damage to the user's lungs and/or may contribute to a negative user experience. However, utilization of the filtering product 206 and/or the mixture 240 in accordance with one or more of the techniques herein may not increase the amount of pressure required to draw smoke from the hookah. In some examples, components of the filtering product 206 are safe for use (without side effects, for example) and/or are not harmful to the environment.

3.2 Water Pipe Filtering Example Scenario 2

Figure 3:
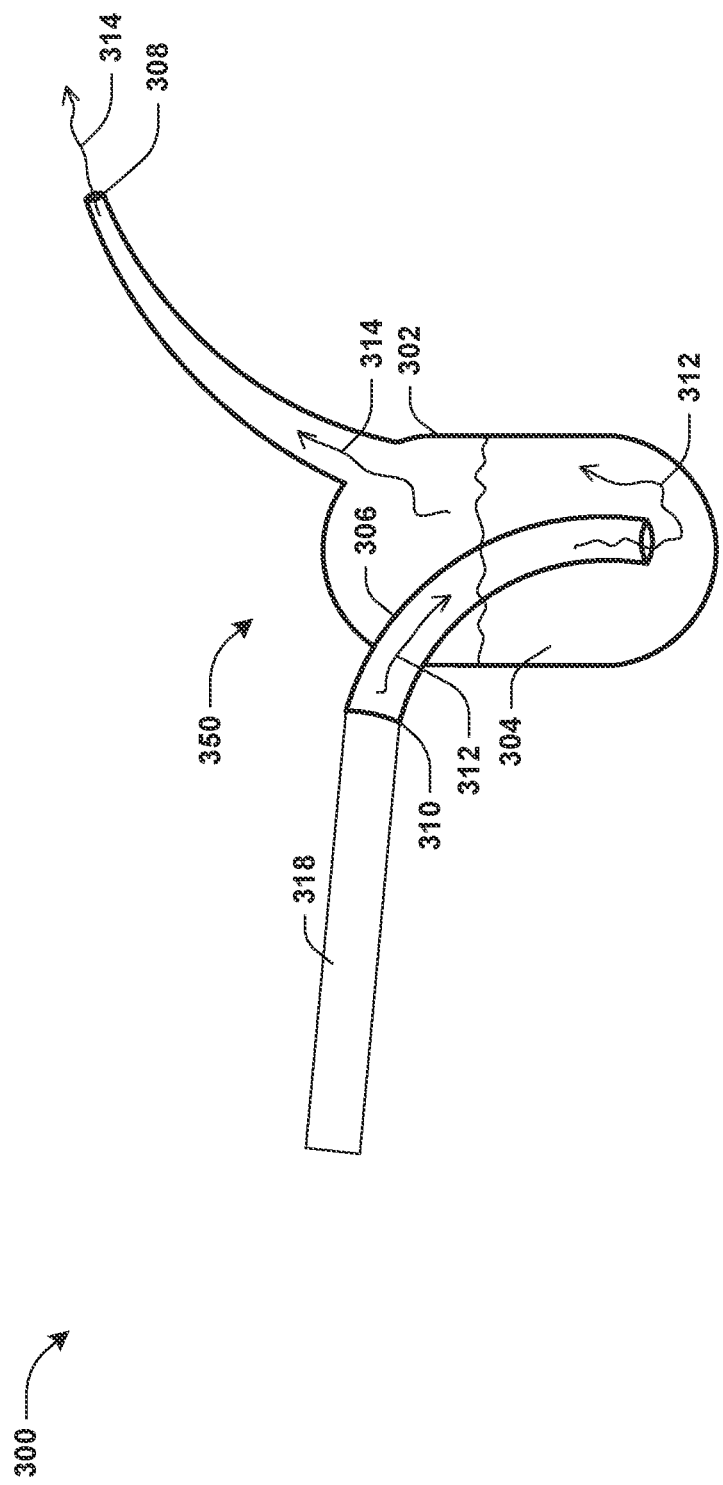
FIG. 3 is an illustration of an exemplary scenario in which a filtering product is used to filter smoke of a water pipe, according to some embodiments.

FIG. 3 illustrates an example scenario 300 in which a filtering product (e.g., a non-effervescent filtering product or an effervescent filtering product such as an effervescent tablet, an effervescent powder and/or effervescent granules) is used to filter smoke of a water pipe 350. In some examples, a mixture 304 may be formed using a filtering product and a liquid (such as according to one or more of the techniques provided with respect to the mixture 240 of the example scenario 200). The mixture 304 may be contained in a chamber 302 of the water pipe 350. In some examples, one or more substances other than the mixture 304 may be contained in the water pipe 350.

In some examples, a smoking component 318 may be affixed to a port 310 of the water pipe 350. The port 310 may be coupled to a water pipe stem 306 that extends into the mixture 304. In some examples, the smoking component 318 may comprise at least one of a cigarette, a cigar, a pipe (e.g., a tobacco pipe), a smoking chamber (e.g., a bowl within which tobacco is disposed), an electronic cigarette (e-cigarette), etc. Smoke 312 may be drawn from the smoking component 318, wherein the smoke 312 is conducted through the port 310 and/or into the stem 306. As the smoke 312 arrives at an end of the stem 306 that is within the mixture 304, the smoke 312 is conducted through the chamber 302 and the smoke 312 bubbles through the mixture 304. The mixture 304 filters the smoke 312 to produce filtered smoke 314. The filtered smoke 314 may be collected within the chamber 302 and/or flows from the chamber 302 out of a mouthpiece 308, and/or into a user's mouth and/or lungs. The smoke 312 may be filtered in accordance with one or more embodiments of the present disclosure, such as one or more embodiments provided with respect to filtering the smoke 230 of the example scenario 200.

In some examples, the smoke 312 may comprise tobacco smoke. Alternatively and/or additionally, the smoke 312 may comprise vapor and/or aerosol, such as vapor and/or aerosol produced by an electronic cigarette.

3.3 Gas Filtering Example Scenario 1

Figure 4:
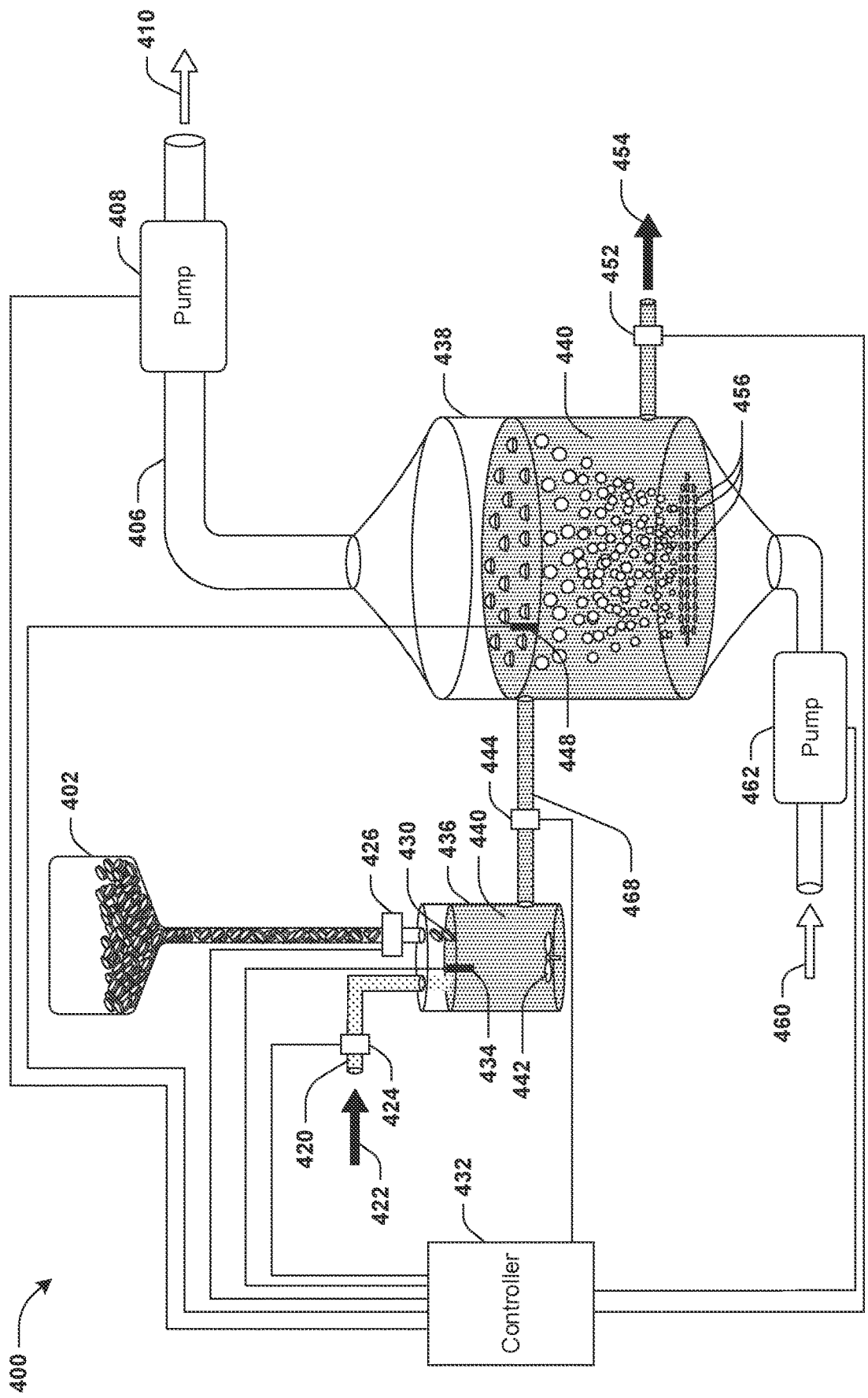
FIG. 4 is an illustration of an example gas filtering system, according to some embodiments.

FIG. 4 illustrates an example gas filtering system 400 according to some embodiments. In some examples, the gas filtering system 400 may use a filtering product 430 and/or a mixture 440 to filter gas 460 (e.g., air) to produce filtered gas 410 (e.g., filtered air). A composition of the filtering product 430 may be in accordance with one or more filtering product embodiments of the present disclosure. In an example, the filtering product 430 may be prepared according to a composition of the tables of FIGS. 1A-1J. Alternatively and/or additionally, a composition of the filtering product 430 may differ from compositions of the tables of FIGS. 1A-1J.

In some examples, the example gas filtering system 400 comprises a hopper 402, a dispenser 426, a first chamber 436, a gas filtering chamber 438, a controller 432 and/or one or more pumps (e.g., one or more gas pumps, such as one or more air pumps) comprising a first pump 462 and/or a second pump 408.

In an example, the dispenser 426 may dispense filtering product 430 from the hopper 402 into the first chamber 436, wherein an amount of filtering product 430 dispensed into the first chamber 436 may be controlled by the dispenser 426. Alternatively and/or additionally, liquid 422 (e.g., water) may be conducted into the first chamber 436 via a tube 420, wherein an amount of liquid 422 conducted into the first chamber 436 may be controlled using a valve 424 (e.g., an automatic valve). In some examples, the dispenser 426 and/or the valve 424 may be controlled by the controller 432. For example, the controller 432 may control the dispenser 426 and/or the valve 424 based upon one or more measures received from one or more sensors. In an example, the one or more sensors comprise one or more first sensors 434 and/or one or more second sensors 448. The one or more first sensors 434 may provide one or more first measures to the controller 432, wherein the one or more first measures comprise at least one of a density of mixture 440 in the first chamber 436, an amount of one or more substances (e.g., one or more substances of the filtering product 430) in the mixture 440 in the first chamber 436, an amount of the mixture 440 in the first chamber 436, etc. The one or more second sensors 448 may provide one or more second measures to the controller 432, wherein the one or more second measures comprise at least one of a density of mixture 440 in the gas filtering chamber 438, an amount of one or more substances (e.g., one or more substances of the filtering product 430) in the mixture 440 in the gas filtering chamber 438, an amount of the mixture 440 in the gas filtering chamber 438, etc. The dispenser 426 and/or the valve 424 may be controlled based upon the one or more first measures and/or the one or more second measures (e.g., the controller 432 may control the amount of filtering product 430 dispensed into the first chamber 436 and/or the amount of liquid 422 conducted into the first chamber 436 based upon the one or more first measures and/or the one or more second measures).

In an example, the mixture 440 may be formed by mixing the filtering product 430 in the liquid 422 utilizing a mixer 442. The mixer 442 may comprise one or more blades in the first chamber 436 (e.g., mixing blades and/or impellers) and/or a motor configured to rotate the one or more blades.

In an example in which the filtering product 430 is an effervescent filtering product (e.g., one or more effervescent tablet, effervescent powder and/or effervescent granules), the mixture 440 may be formed by dispensing the filtering product 430 in the first chamber 436, wherein the filtering product 430 may be dispersed (and/or may disintegrate and/or dissolve) in the mixture 440 by reactions of one or more effervescent agents in the filtering product 430.

In some examples, the mixture 440 may be conducted from the first chamber 436 to the gas filtering chamber 438 (via a tube 468, for example). An amount of mixture 440 conducted into the gas filtering chamber 438 may be controlled using a valve 444 (e.g., an automatic valve). The valve 444 may be controlled based upon the one or more first measures and/or the one or more second measures (e.g., the controller 432 may control the amount of mixture 440 conducted into the gas filtering chamber 438 based upon the one or more first measures and/or the one or more second measures).

Alternatively and/or additionally, utilized mixture 454 (e.g., contaminated mixture) may be conducted from the gas filtering chamber 438 to out of the gas filtering chamber 438. For example, an amount of utilized mixture 454 conducted from the gas filtering chamber 438 to out of the gas filtering chamber 438 may be controlled using a valve 452 (e.g., an automatic valve). The valve 452 may be controlled based upon the one or more first measures and/or the one or more second measures (e.g., the controller 432 may control the amount of utilized mixture 454 conducted from the gas filtering chamber 438 to out of the gas filtering chamber 438 based upon the one or more first measures and/or the one or more second measures).

In some examples, (i) the amount of filtering product 430 dispensed into the first chamber 436, (ii) the amount of liquid 422 conducted into the first chamber 436, (iii) the amount of mixture 440 conducted into the gas filtering chamber 438, and/or (iv) the amount of utilized mixture 454 conducted from the gas filtering chamber 438 to out of the gas filtering chamber 438, may be controlled by the controller 432 (via controlling the dispenser 426, the valve 424, the valve 444 and/or the valve 352, for example) to (a) maintain an amount of mixture 440 in the gas filtering chamber 438 (such that an amount of mixture 440 in the gas filtering chamber 438 is within a defined range, for example), (b) maintain one or more levels of one or more compounds of the filtering product 430 in the mixture 440 in the gas filtering chamber 438 (such that an amount of a compound of the filtering product 430 is within a defined range, for example), and/or (c) maintain one or more levels of contaminants and/or impurities in the mixture 440 in the gas filtering chamber 438 (such that an amount of contaminants and/or impurities in the mixture 440 does not exceed a threshold, for example).

In some examples, the gas 460 may be conducted, via one or more holes 456, through the gas filtering chamber 438. For example, the gas 460 may bubble through the mixture 440 in the gas filtering chamber 438. The mixture 440 filters the gas 460 to produce the filtered gas 410. The gas 460 may be filtered in accordance with one or more embodiments of the present disclosure, such as one or more embodiments provided with respect to filtering the smoke 230 of the example scenario 200. The one or more pumps (e.g., the first pump 462 and/or the second pump 408) may be utilized to conduct the gas 460 and/or the filtered gas 410. The filtered gas 410 may be conducted from the gas filtering chamber 438, through a tube 406, to outside of the tube 406, such as into one of a room, an outdoors area, etc. Accordingly, using the example gas filtering system 400 may lead to benefits including a reduction in air pollution, healthier and/or cleaner gas (e.g., air) and/or the filtered gas 410 having a reduced amount of at least one of toxic chemicals, carcinogens, contaminants, impurities, undesired substances, heavy metals, etc. compared to the gas 460.

3.4 Gas Filtering Example Scenario 2

Figure 5:
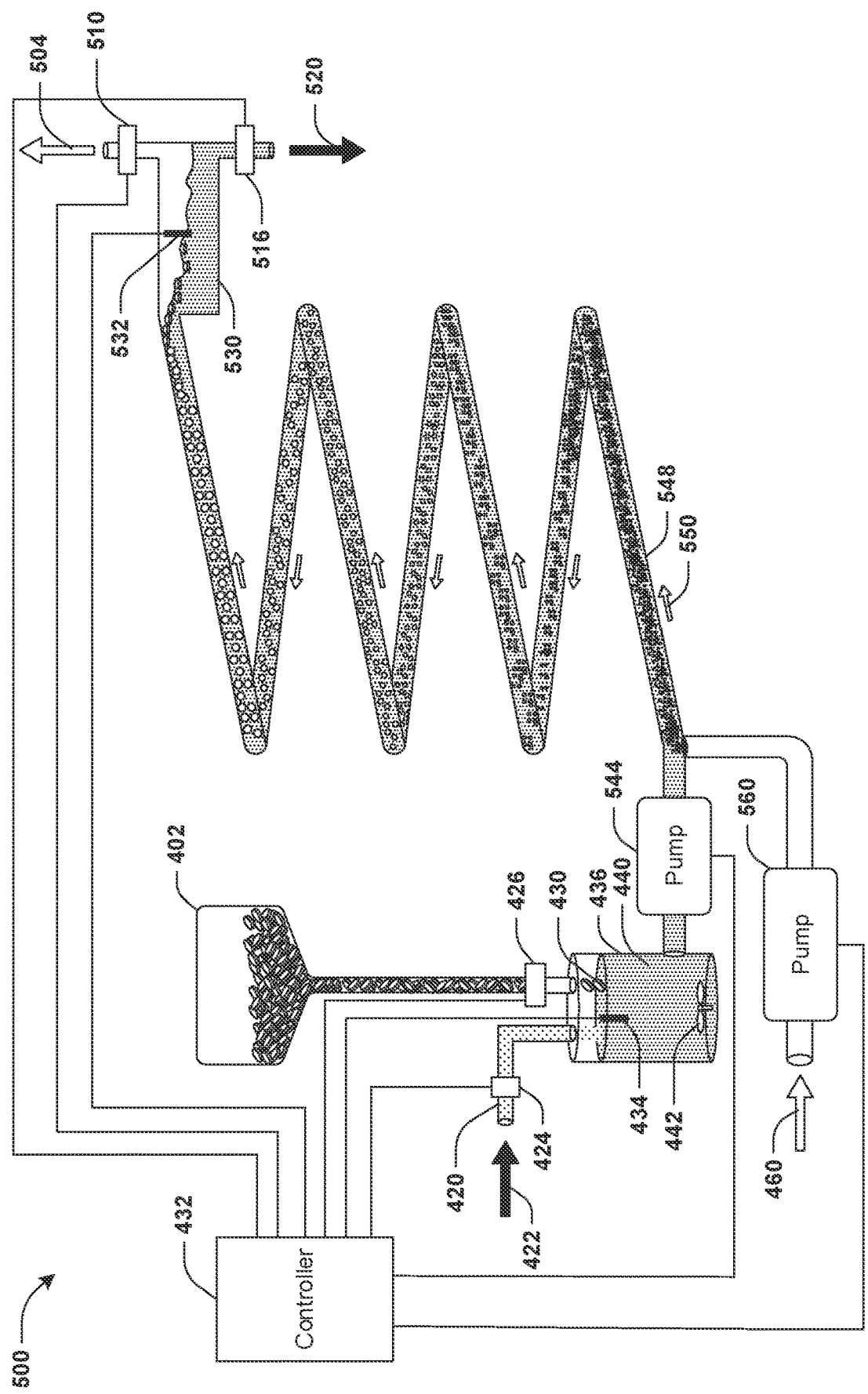
FIG. 5 is an illustration of an example gas filtering system, according to some embodiments.

FIG. 5 illustrates an example gas filtering system 500 according to some embodiments. In some examples, the gas filtering system 500 may use a filtering product 430 and/or a mixture 440 to filter gas 460 (e.g., air) to produce filtered gas 504 (e.g., filtered air). A composition of the filtering product 430 may be in accordance with one or more filtering product embodiments of the present disclosure. In an example, the filtering product 430 may be prepared according to a composition of the tables of FIGS. 1A-1J. Alternatively and/or additionally, a composition of the filtering product 430 may differ from compositions of the tables of FIGS. 1A-1J.

In some examples, the example gas filtering system 500 comprises a hopper 402, a dispenser 426, a first chamber 436, a gas filtering tube 548, a controller 432 and/or one or more pumps (e.g., one or more gas pumps, such as one or more air pumps, and/or one or more liquid pumps, such as one or more water pumps) comprising a liquid pump 544 and/or a gas pump 560.

In an example, a mixture 440 may be formed using one or more of the techniques provided with respect to the example gas filtering system 400 of FIG. 4. The first chamber 436 may contain the mixture 440. The liquid pump 544 and/or the gas pump 560 may be utilized to conduct the mixture 440 and/or the gas 460 into the gas filtering tube 548, respectively. In some examples, the gas filtering tube 548 may be angled upwards and/or may be spiral shaped. Accordingly, the gas 460 and/or the mixture 440 may flow, at an upwards angle 550, through the gas filtering tube 548. Embodiments are contemplated in which the gas filtering tube 548 is not angled upwards and/or is not spiral shaped as shown in FIG. 5. Accordingly, throughout at least some of the gas filtering tube 548, the gas 460 may bubble through the mixture 440. The gas 460 may be filtered in accordance with one or more embodiments of the present disclosure, such as one or more embodiments provided with respect to filtering the smoke 230 of the example scenario 200. The filtered gas 504 may be conducted from the gas filtering tube 548, through a second chamber 530, and/or to outside of the second chamber 530, such as into one of a room, an outdoors area, etc. Accordingly, using the example gas filtering system 500 may lead to benefits including a reduction in air pollution, healthier and/or cleaner gas (e.g., air) and/or the filtered gas 504 having a reduced amount of at least one of toxic chemicals, carcinogens, contaminants, impurities, undesired substances, heavy metals, etc. compared to the gas 460.

Flow of the filtered gas 504 to outside of the second chamber 530 may be controlled using a valve 510 (e.g., an automatic valve). In some examples, the valve 510 may be controlled by the controller 432. For example, the controller 432 may control the valve 424 based upon one or more measures received from one or more sensors. In an example, the one or more sensors comprise one or more first sensors 434 and/or one or more second sensors 532. The one or more first sensors 434 may provide one or more first measures to the controller 432, wherein the one or more first measures comprise at least one of a density of mixture 440 in the first chamber 436, an amount of one or more substances (e.g., one or more substances of the filtering product 430) in the mixture 440 in the first chamber 436, an amount of the mixture 440 in the first chamber 436, etc. Alternatively and/or additionally, the one or more second sensors 532 may provide one or more second measures to the controller 432, wherein the one or more second measures comprise at least one of a density of mixture 440 in the gas filtering tube 548 and/or the second chamber 530, an amount of one or more substances (e.g., one or more substances of the filtering product 430) in the mixture 440 in the gas filtering tube 548 and/or the second chamber 530, an amount of the mixture 440 in the gas filtering tube 548 and/or the second chamber 530, etc.

Alternatively and/or additionally, utilized mixture 520 (e.g., contaminated mixture) may be conducted from the second chamber 530 to out of the second chamber 530. For example, an amount of utilized mixture 520 conducted from the second chamber 530 to out of the second chamber 530 may be controlled using a valve 516 (e.g., an automatic valve). The valve 516 may be controlled based upon the one or more first measures and/or the one or more second measures (e.g., the controller 432 may control the amount of utilized mixture 520 conducted from the second chamber 530 to out of the second chamber 530 based upon the one or more first measures and/or the one or more second measures).

In some examples, in the example gas filtering system 500, the controller 432 may control the dispenser 426, the valve 424, the valve 510 and/or the valve 516 using one or more of the techniques provided herein with respect to the example gas filtering system 400 of FIG. 4.

3.5 Gas Filtering Example Scenario 3

Figure 6:
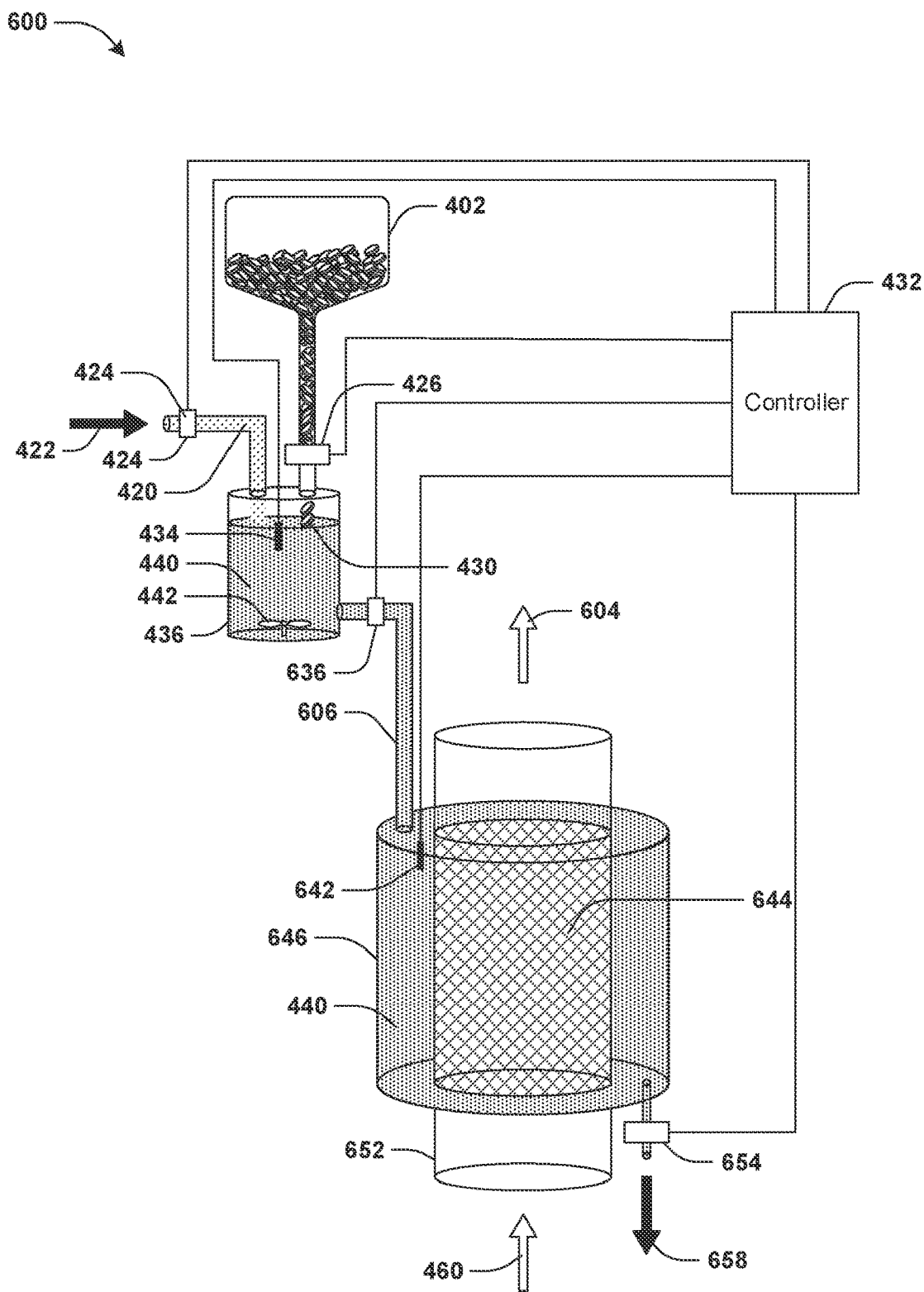
FIG. 6 is an illustration of an example gas filtering system, according to some embodiments.

FIG. 6 illustrates an example gas filtering system 600 according to some embodiments. In some examples, the gas filtering system 600 may use a filtering product 430 and/or a mixture 440 to filter gas 460 (e.g., air) to produce filtered gas 604 (e.g., filtered air). A composition of the filtering product 430 may be in accordance with one or more filtering product embodiments of the present disclosure. In an example, the filtering product 430 may be prepared according to a composition of the tables of FIGS. 1A-1J. Alternatively and/or additionally, a composition of the filtering product 430 may differ from compositions of the tables of FIGS. 1A-1J.

In some examples, the example gas filtering system 600 comprises a hopper 402, a dispenser 426, a first chamber 436, a gas filtering chamber 646, a porous media 644, a controller 432, a duct 652 (e.g., an air duct) and/or one or more pumps (not shown) (e.g., one or more gas pumps, such as one or more air pumps and/or one or more liquid pumps, such as one or more water pumps).

In an example, a mixture 440 may be formed using one or more of the techniques provided with respect to the example gas filtering system 400 of FIG. 4. The first chamber 436 may contain the mixture 440. In some examples, the mixture 440 may be conducted from the first chamber 436 to the gas filtering chamber 646 (via a tube 606, for example). An amount of mixture 440 conducted into the gas filtering chamber 646 may be controlled using a valve 636 (e.g., an automatic valve). The valve 636 may be controlled by the controller 432. For example, the controller 432 may control the valve 636 based upon one or more measures received from one or more sensors. In an example, the one or more sensors comprise one or more first sensors 434 and/or one or more second sensors 642. The one or more first sensors 434 may provide one or more first measures to the controller 432, wherein the one or more first measures comprise at least one of a density of mixture 440 in the first chamber 436, an amount of one or more substances (e.g., one or more substances of the filtering product 430) in the mixture 440 in the first chamber 436, an amount of the mixture 440 in the first chamber 436, etc. Alternatively and/or additionally, the one or more second sensors 642 may provide one or more second measures to the controller 432, wherein the one or more second measures comprise at least one of a density of mixture 440 in the gas filtering chamber 646, an amount of one or more substances (e.g., one or more substances of the filtering product 430) in the mixture 440 in the gas filtering chamber 646, an amount of the mixture 440 in the gas filtering chamber 646, etc.

In some examples, the porous media 644 may comprise a porous material (e.g., a highly porous material, such as a material with a porosity exceeding a threshold porosity), such as at least one of sponge, cork, etc. The porous media 644 may be within the duct 652 that extends through the gas filtering chamber 646. Mixture 440 from the gas filtering chamber 646 may be administered to the porous media 644 (e.g., conducted to the porous media 644 and/or injected into the porous media 644) and/or the porous media 644 may absorb and/or contain at least some of the mixture 440. The gas 460 may flow through the duct 652. The gas 460 may contact the porous media 644 (e.g., the porous media 644 soaked with mixture 440) and/or mixture 440 absorbed and/or contained in the porous media 644. Accordingly, the mixture 440 may react with the gas 460 to produce the filtered gas 604 (e.g., the mixture 440 and/or the porous media 644 may filter the gas 460 to produce the filtered gas 604). In an example, the filtered gas 604 may be conducted to outside of the vent 652, such as into one of a room, an outdoors area, etc. Accordingly, using the example gas filtering system 600 may lead to benefits including a reduction in air pollution, healthier and/or cleaner gas (e.g., air) and/or the filtered gas 604 having a reduced amount of at least one of toxic chemicals, carcinogens, contaminants, impurities, undesired substances, heavy metals, etc. compared to the gas 460.

Alternatively and/or additionally, utilized mixture 658 (e.g., contaminated mixture) may be conducted from the gas filtering chamber 646 to out of the gas filtering chamber 646. For example, an amount of utilized mixture 658 conducted from the gas filtering chamber 646 to out of the gas filtering chamber 646 may be controlled using a valve 654 (e.g., an automatic valve). The valve 654 may be controlled based upon the one or more first measures and/or the one or more second measures (e.g., the controller 432 may control the amount of utilized mixture 658 conducted from the gas filtering chamber 646 to out of the gas filtering chamber 646 based upon the one or more first measures and/or the one or more second measures).

In some examples, in the example gas filtering system 600, the controller 432 may control the dispenser 426, the valve 424, the valve 636 and/or the valve 654 using one or more of the techniques provided herein with respect to the example gas filtering system 400 of FIG. 4.

4. FILTERING DATA

Figure 9:
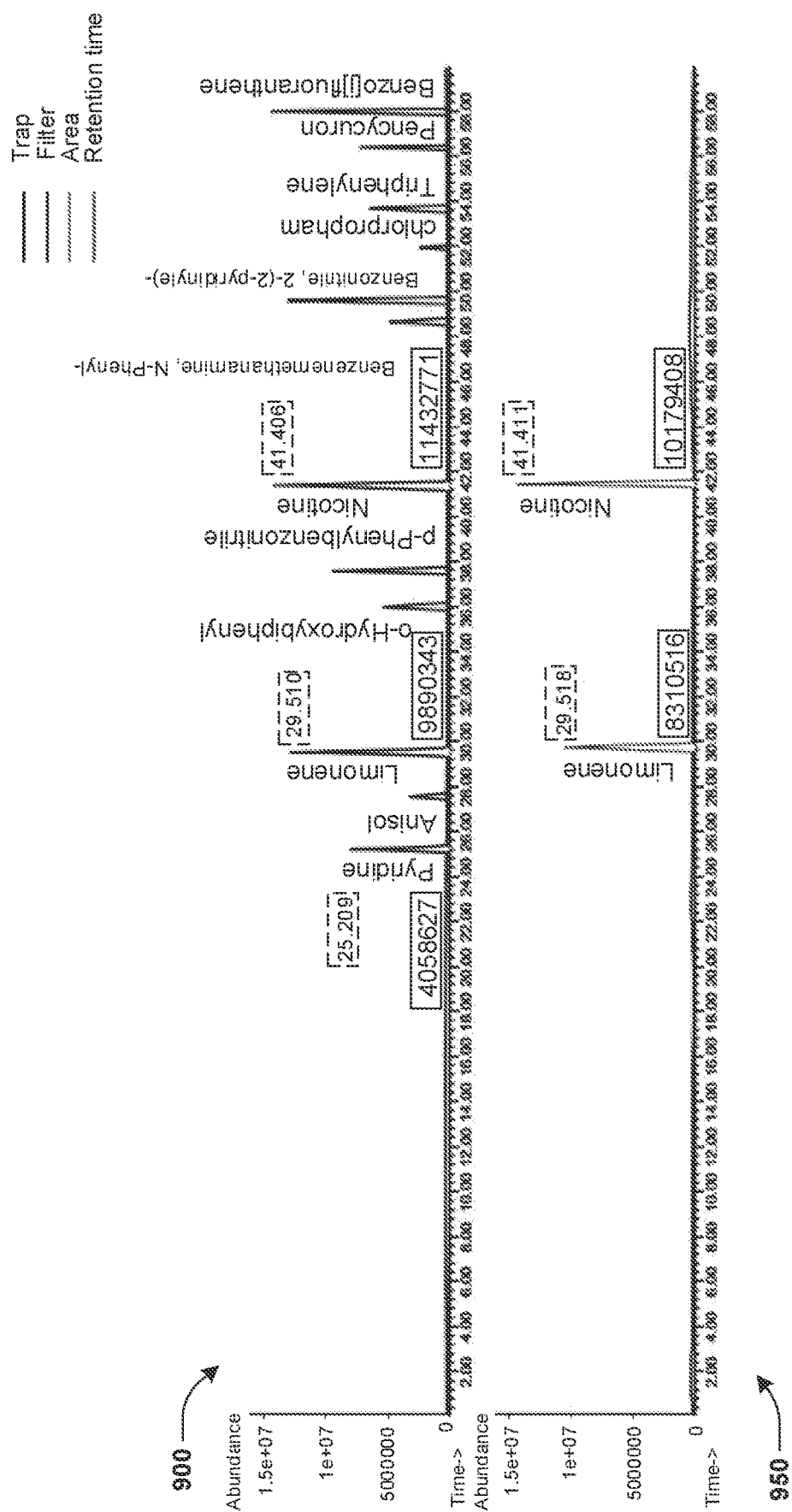
FIG. 9 presents charts showing results of a gas chromatography/mass spectrometry (GC/MS) instrument, wherein the results provide abundances of chemical compounds measured using the GC/MS instrument, according to some embodiments.

FIGS. 7-9 provide data sets that demonstrate effectiveness of filtering smoke using a filtering product in accordance with one or more of the techniques of the present disclosure. In an example, filtering products used to achieve one or more of the filtering results shown in the data sets of FIGS. 7-9 may comprise titanium dioxide, CTAB and/or ascorbic acid. Alternatively and/or additionally, smoke (e.g., tobacco smoke, vapor and/or aerosol) may be filtered using one or more of the techniques provided with respect to FIGS. 2A-2E and/or FIG. 3 to achieve one or more of the filtering results shown in the data sets of FIGS. 7-9.

FIG. 7 presents a table 700 of levels of heavy metals in smoke that is filtered using a filtering product according to the present disclosure and in smoke that is not filtered using a filtering product according to the present disclosure. Heavy metal content values shown in the table 700 may be determined using a Graphite Furnace—Atomic Absorption Spectroscopy (GF-AAS) instrument.

As shown in the table 700, without using a filtering product according to the present disclosure, electronic cigarette smoke (e.g., vapor and/or aerosol of an electronic cigarette) may have a lead content of about 29.02 micrograms per liter of smoke, a chromium content of about 17.30 micrograms per liter of smoke and/or a cadmium content of about 238.77 micrograms per liter of smoke. Using a filtering product according to the present disclosure, the lead content is reduced to about 11.31 micrograms per liter of smoke, the chromium content is reduced to about 6.80 micrograms per liter of smoke and/or the cadmium content is reduced to about 21.39 micrograms per liter of smoke.

As shown in the table 700, without using a filtering product according to the present disclosure, hookah smoke (e.g., tobacco smoke of a hookah) may have a lead content of about 11.05 micrograms per liter of smoke, a chromium content of about 0.21 micrograms per liter of smoke and/or a cadmium content of about 28.00 micrograms per liter of smoke. Using a filtering product according to the present disclosure, the lead content is reduced to about 2.78 micrograms per liter of smoke, the chromium content is reduced to <LOQ (less than Limits of Quantification (LOQ)) per liter of smoke and/or the cadmium content is reduced to about 3.40 micrograms per liter of smoke.

FIG. 8 presents a table 800 of levels of chemical compounds in hookah smoke (e.g., tobacco smoke of a hookah) that is filtered using a filtering product according to the present disclosure and in hookah smoke that is not filtered using a filtering product according to the present disclosure. Values of the content of chemical compounds are shown in units of micrograms per puff (e.g., puff of a hookah). As shown in the table 800, the filtering product provides for high filtering selectivity and/or accuracy such that an amount by which nicotine is reduced as a result of using the filtering product is less than amounts by which other chemical compounds (e.g., pyridine, formaldehyde, etc.) are reduced as a result of using the filtering product.

FIG. 9 presents a first chart 900 and a second chart 950 below the first chart 900. The charts 900 and 950 show results of a gas chromatography/mass spectrometry (GC/MS) instrument, wherein the results provide abundances of chemical compounds measured using the GC/MS instrument. Vertical axes of charts 900 and 950 correspond to abundances of chemical compounds measured by the GC/MS instrument. Horizontal axes of charts 900 and 950 correspond to times (e.g., retention times) associated with measurements of chemical compound abundances using the GC/MS instrument. The chart 900 shows abundances of chemical compounds in hookah smoke (e.g., tobacco smoke of a hookah) that is not filtered using a filtering product according to the present disclosure and chart 950 shows abundances of chemical compounds in hookah smoke that is filtered using a filtering product according to the present disclosure. In FIG. 9, times (e.g., retention times) associated with measurements of chemical compound abundances are shown in boxes with dashed lines, and areas (e.g., area under curves) of chemical compound abundances are shown in boxes with solid lines. As shown in FIG. 9, differences between area under curves of limonene and nicotine between the first chart 900 and the second chart 950 are less than differences between area under curves of other chemical compounds (e.g., toxic chemical compounds) of hookah smoke, which may demonstrate that the filtering product provides for high filtering selectivity and/or accuracy such that amounts by which limonene and/or nicotine are reduced as a result of using the filtering product are less than amounts by which other chemical compounds (e.g., pyridine, formaldehyde, etc.) are reduced as a result of using the filtering product. Thus, by using the filtering product in accordance with one or more of the techniques herein, a user may enjoy desired aspects (e.g., nicotine and/or tobacco flavor such as limonene) of a water pipe experience (without contributing to negative health impacts associated with toxic chemical compounds, for example).

5. EXAMPLE EMBODIMENTS

5.1 Example Embodiment 1

In an embodiment, a filtering product is provided. The filtering product may be used for filtering smoke (e.g., at least one of smoke of a water pipe, vapor, aerosol, etc.), such as using one or more of the techniques provided herein with respect to the example scenario 200 of FIGS. 2A-2E and/or the example scenario 300 of FIG. 3. Alternatively and/or additionally, the filtering product may be used for filtering gas (e.g., air), such as using one or more of the techniques provided herein with respect to the example gas filtering system 400 of FIG. 4, the example gas filtering system 500 of FIG. 5 and/or the example gas filtering system 600 of FIG. 6. For example, a mixture may be formed using the filtering product and a liquid (e.g., water), such as using one or more of the techniques provided herein.

The filtering product may comprise one or more filtering agents for filtering at least one of toxic chemicals, carcinogens, contaminants, impurities, undesired substances, heavy metals, etc. from the smoke and/or the gas. The one or more filtering agents may comprise one or more first filtering agents for filtering one or more chemical compounds (e.g., at least one of one or more organic compounds, one or more nitrogenous compounds, one or more aromatic compounds, one or more cyclic compounds, one or more heterocyclic compounds, one or more amines, one or more carcinogenic compounds, one or more mono-aromatic hydrocarbons, one or more poly-aromatic hydrocarbons, one or more unsaturated aliphatic hydrocarbons, one or more aliphatic amines, one or more aromatic amines, one or more carbonyl compounds, etc.) from the smoke and/or the gas. The one or more chemical compounds may comprise at least one of Pyridine, Phenol, Benzene, Propylene oxide, Benzopyrene, one or more cyanides, p-Phenylbenzonitrile, Benzonitrile, 2-(2-pyridinyl), Benzenemethanamine n-Phenyl, Triphenylene, etc. The one or more first filtering agents may comprise one or more metal nanoparticles, such as one or more metal oxide nanoparticles. For example, the one or more first filtering agents may comprise at least one of $Fe_3O_4$ nanoparticles, $Fe_2O_3$ nanoparticles, UiO-66 nanoparticles, ZnO nanoparticles, CuO nanoparticles, Ag nanoparticles, Au nanoparticles, $TiO_2$ nanoparticles, etc. Alternatively and/or additionally, the one or more first filtering agents may comprise one or more surfactants, such as one or more cationic surfactants. For example, the one or more surfactants may comprise at least one of benzalkonium, Dimethyldioctadecylammonium chloride, Dimethyldioctadecylammonium bromide, benzethonium, methylbenzethonium, cetylpyridinium, alkyl-dimethyl dichlorobenzene ammonium, dequalinium, phenamylinium and alkyl-dimethyl ammonium chlorides, cethexonium, alkyl-dimethyl dichlorobenzene ammonium bromides, CTAB, etc. In some examples, the one or more chemical compounds may be filtered from the smoke and/or the gas using the one or more first filtering agents. For example, the one or more chemical compounds may be filtered from the smoke and/or the gas using the one or more metal nanoparticles and/or the one or more surfactants. In an example, the one or more surfactants may act as catalysts to assist (e.g., increase, facilitate and/or enhance) filtering of the one or more chemical compounds from the smoke using the one or more metal nanoparticles, wherein the one or more metal nanoparticles may act as an aromatic sorbent. In some examples, at least some of the one or more chemical compounds may be trapped in the mixture, adsorbed, degraded, absorbed and/or converted by the one or more first filtering agents, such as the one or more metal nanoparticles and/or the one or more surfactants. For example, at least some of the one or more chemical compounds may be adsorbed on surfaces of nanoparticles of the one or more metal nanoparticles in the mixture. Alternatively and/or additionally, at least some of the one or more chemical compounds may be partially dissolved in the mixture, and may subsequently be adsorbed on surfaces of nanoparticles of the one or more metal nanoparticles in the mixture. Alternatively and/or additionally, chemical compounds, of the one or more chemical compounds, that are adsorbed on nanoparticles of the one or more metal nanoparticles, may be converted to non-toxic compounds and/or water soluble compounds (via a photocatalytic reaction, such as a photocatalytic oxidation reaction, for example). Alternatively and/or additionally, nanoparticles of the one or more metal nanoparticles may be stabilized using the one or more surfactants in the mixture. Alternatively and/or additionally, the one or more first filtering agents may comprise ionic liquid (e.g., $BMIM-PF_6$), wherein the ionic liquid may assist (e.g., increase, facilitate and/or enhance) degradation of at least some of the one or more chemical compounds. Alternatively and/or additionally, the ionic liquid may assist (e.g., increase, facilitate and/or enhance) interactions between nanoparticles of the one or more metal nanoparticles and aromatic compounds. Alternatively and/or additionally, the ionic liquid may assist (e.g., increase, facilitate and/or enhance) adsorption of aromatic gases on surfaces of nanoparticles of the one or more metal nanoparticles.

The one or more filtering agents may comprise one or more second filtering agents for filtering one or more heavy metals from the smoke and/or the gas. The one or more heavy metals may comprise at least one of mercury, lead, cadmium, chromium, etc. In some examples, the one or more heavy metals may be filtered from the smoke and/or the gas using the one or more second filtering agents in the mixture. In some examples, at least some of the one or more heavy metals may be trapped in the mixture and/or converted using the one or more second filtering agents. In some examples, the one or more second filtering agents may comprise one or more acids (e.g., one or more low molecular weight organic acids). In some examples, the one or more acids may comprise at least one of salicylic acid, humic acid, gallic acid, syringic acid, shikimic acid, etc. In some examples, at least some heavy metals of the one or more heavy metals may react with an acid of the one or more acids to form a complex structure of heavy metals and the acid, wherein the complex structure may be water-soluble and/or may sediment.

In some examples, the filtering product may be enclosed in a capsule (e.g., at least one of a hard-shelled capsule, a soft-shelled capsule, etc.).

In some examples, the filtering product may be a non-effervescent product.

In some examples, the filtering product may be an effervescent product, such as an effervescent tablet, effervescent powder or effervescent granules. The filtering product may comprise one or more effervescent agents comprising one or more acids and/or one or more bases. For example, the liquid (e.g., water) may liberate the one or more acids and the one or more bases and/or enables the one or more acids and the one or more bases to react with each other to produce a gas (e.g., carbon dioxide). In some examples, the one or more acids of the one or more effervescent agents may comprise at least one of citric acid, aspartic acid, malic acid, adipic acid, tartaric acid, fumaric acid, succinic acid, sodium acid pyrophosphate, lactic acid, hexamic acid, amino acid hydrochlorides, acid salts, acid anhydrides, etc. In some examples, the one or more bases of the one or more effervescent agents may comprise at least one of sodium carbonate, sodium bicarbonate, potassium bicarbonate, sodium sesquicarbonate, potassium carbonate, calcium carbonate, magnesium carbonate, zinc carbonate, etc.

In some examples, the filtering product may comprise one or more binders (such as in an example in which the filtering product is an effervescent tablet). In some examples, the one or more binders may comprise at least one of PVP, PEG, glucose, a tablet binder, disaccharides, polysaccharides, derivatives of polysaccharides, sugar alcohols, gelatin, etc.

5.2 Example Embodiment 2

In an embodiment, a filtering product is provided. The filtering product may be used for filtering smoke (e.g., at least one of smoke of a water pipe, vapor, aerosol, etc.), such as using one or more of the techniques provided herein with respect to the example scenario 200 of FIGS. 2A-2E and/or the example scenario 300 of FIG. 3. Alternatively and/or additionally, the filtering product may be used for filtering gas (e.g., air), such as using one or more of the techniques provided herein with respect to the example gas filtering system 400 of FIG. 4, the example gas filtering system 500 of FIG. 5 and/or the example gas filtering system 600 of FIG. 6. For example, a mixture may be formed using the filtering product and a liquid (e.g., water), such as using one or more of the techniques provided herein.

The filtering product may comprise one or more filtering agents for filtering at least one of toxic chemicals, carcinogens, contaminants, impurities, undesired substances, heavy metals, etc. from the smoke and/or the gas. The one or more filtering agents may comprise one or more first filtering agents for filtering one or more chemical compounds (e.g., at least one of one or more organic compounds, one or more nitrogenous compounds, one or more aromatic compounds, one or more cyclic compounds, one or more heterocyclic compounds, one or more amines, one or more carcinogenic compounds, one or more mono-aromatic hydrocarbons, one or more poly-aromatic hydrocarbons, one or more unsaturated aliphatic hydrocarbons, one or more aliphatic amines, one or more aromatic amines, one or more carbonyl compounds, etc.) from the smoke and/or the gas. The one or more chemical compounds may comprise at least one of Pyridine, Phenol, Benzene, Propylene oxide, Benzopyrene, one or more cyanides, p-Phenylbenzonitrile, Benzonitrile, 2-(2-pyridinyl), Benzenemethanamine n-Phenyl, Triphenylene, etc. The one or more filtering agents may comprise one or more second filtering agents for filtering one or more heavy metals from the smoke and/or the gas. The one or more heavy metals may comprise at least one of mercury, lead, cadmium, chromium, etc.

The one or more first filtering agents may comprise titanium dioxide and/or CTAB. The one or more second filtering agents may comprise ascorbic acid.

In one embodiment, a ratio of the CTAB to the titanium dioxide by weight is in a range of ratios, wherein the range of ratios is one of: about 0.01:1 to about 1:1, preferably about 0.01:1 to about 0.5:1, more preferably about 0.01:1 to about 0.3:1, even more preferably about 0.03:1 to about 0.2:1, or especially preferred about 0.03:1 to about 0.07:1 or about 0.12:1 to about 0.18:1.

In one embodiment, a ratio of the ascorbic acid to the titanium dioxide by weight is in a range of ratios, wherein the range of ratios is one of: about 0.1:1 to about 10:1, preferably about 0.2:1 to about 5:1, more preferably about 0.2:1 to about 3:1, even more preferably about 0.3:1 to about 2:1, or especially preferred about 0.5:1 to about 0.8:1 or about 0.9:1 to about 1.2:1.

In some examples, the one or more first filtering agents may comprise ionic liquid (e.g., BMIM-PF$_6$).

In one embodiment, a ratio of the ionic liquid to the titanium dioxide by weight is in a range of ratios, wherein the range of ratios is one of: about 0.01:1 to about 10:1, preferably about 0.01:1 to about 5:1, more preferably about 0.1:1 to about 1:1, even more preferably about 0.1:1 to about 0.35:1, or especially preferred about 0.16:1 to about 0.3:1.

In some examples, the filtering product may be enclosed in a capsule (e.g., at least one of a hard-shelled capsule, a soft-shelled capsule, etc.).

In some examples, the filtering product may be a non-effervescent product.

In some examples, the filtering product may be an effervescent product, such as an effervescent tablet, effervescent powder or effervescent granules. The filtering product may comprise one or more effervescent agents comprising one or more acids and/or one or more bases. In some examples, the one or more acids of the one or more effervescent agents may comprise at least one of citric acid, aspartic acid, malic acid, adipic acid, tartaric acid, fumaric acid, succinic acid, sodium acid pyrophosphate, lactic acid, hexamic acid, amino acid hydrochlorides, acid salts, acid anhydrides, etc. In some examples, the one or more bases of the one or more effervescent agents may comprise at least one of sodium carbonate, sodium bicarbonate, potassium bicarbonate, sodium sesquicarbonate, potassium carbonate, calcium carbonate, magnesium carbonate, zinc carbonate, etc.

In one embodiment, a ratio of the one or more acids to the titanium dioxide by weight is in a range of ratios, wherein the range of ratios is one of: about 0.1:1 to about 50:1, preferably about 1:1 to about 30:1, more preferably about 1:1 to about 20:1, even more preferably about 1:1 to about 5:1, or especially preferred about 2:1 to about 3:1 or about 3:1 to about 4:1.

In one embodiment, a ratio of the one or more bases to the titanium dioxide by weight is in a range of ratios, wherein the range of ratios is one of: about 0.1:1 to about 100:1, preferably about 1:1 to about 50:1, more preferably about 1:1 to about 30:1, even more preferably about 2:1 to about 9:1, or especially preferred about 4:1 to about 6:1 or about 6:1 to about 9:1.

In some examples, the filtering product may comprise one or more binders (such as in an example in which the filtering product is an effervescent tablet). In some examples, the one or more binders may comprise at least one of PVP, PEG, glucose, a tablet binder, disaccharides, polysaccharides, derivatives of polysaccharides, sugar alcohols, gelatin, etc.

In one embodiment, a ratio of the one or more binders to the titanium dioxide by weight is in a range of ratios, wherein the range of ratios is one of: about 0.5:1 to about 200:1, preferably about 0.5:1 to about 100:1, more preferably about 0.5:1 to about 50:1, even more preferably about 0.5:1 to about 5:1, or especially preferred about 1:1 to about 3:1.

5.3 Example Embodiment 3

In an embodiment, a mixture is provided. The mixture may be used for filtering smoke (e.g., at least one of smoke of a water pipe, vapor, aerosol, etc.), such as using one or more of the techniques provided herein with respect to the example scenario 200 of FIGS. 2A-2E and/or the example scenario 300 of FIG. 3. Alternatively and/or additionally, the mixture may be used for filtering gas (e.g., air), such as using one or more of the techniques provided herein with respect to the example gas filtering system 400 of FIG. 4, the example gas filtering system 500 of FIG. 5 and/or the example gas filtering system 600 of FIG. 6. For example, the mixture may be formed using a filtering product and a liquid (e.g., water), such as using one or more of the techniques provided herein. In some examples, a composition of the mixture and/or the filtering product may be in accordance with one or more embodiments of the present disclosure. In some examples, the mixture may comprise one or more filtering agents for filtering at least one of toxic chemicals, carcinogens, contaminants, impurities, undesired substances, heavy metals, etc. from the smoke and/or the gas. The one or more filtering agents may comprise one or more first filtering agents for filtering one or more chemical compounds from the smoke and/or the gas. The one or more first filtering agents may comprise one or more metal nanoparticles, such as one or more metal oxide nanoparticles. For example, the one or more first filtering agents may comprise at least one of $Fe_3O_4$ nanoparticles, $Fe_2O_3$ nanoparticles, UiO-66 nanoparticles, ZnO nanoparticles, CuO nanoparticles, Ag nanoparticles, Au nanoparticles, $TiO_2$ nanoparticles, etc. Alternatively and/or additionally, the one or more first filtering agents may comprise one or more surfactants, such as one or more cationic surfactants. For example, the one or more surfactants may comprise at least one of benzalkonium, Dimethyldioctadecylammonium chloride, Dimethyldioctadecylammonium bromide, benzethonium, methylbenzethonium, cetylpyridinium, alkyl-dimethyl dichlorobenzene ammonium, dequalinium, phenamylinium and alkyl-dimethyl ammonium chlorides, cethexonium, alkyl-dimethyl dichlorobenzene ammonium bromides, CTAB, etc. Alternatively and/or additionally, the one or more first filtering agents may comprise ionic liquid (e.g., BMIM-PF$_6$). The one or more filtering agents may comprise one or more second filtering agents for filtering one or more heavy metals from the smoke and/or the gas. In some examples, the one or more second filtering agents may comprise one or more acids (e.g., one or more low molecular weight organic acids). In some examples, the one or more acids may comprise at least one of salicylic acid, humic acid, gallic acid, syringic acid, shikimic acid, etc.

5.4 Example Embodiment 4

According to some embodiments, a filtering product is provided.

According to some embodiments, the filtering product filters a wide range of toxins and chemicals in hookah smoke such as nitrogenous and carcinogenic compounds, amine compounds, and heavy metals. The filtering product may be available in tablet form and the smoker drops the effervescent tablet in the hookah water bowl. According to some embodiments, the tablet is activated in the presence of water and dissolves its compounds in the bowl water. According to some embodiments, then, when smoke is flowing from the water, nicotine and limonene (e.g., the main bases of the taste in the fruit hookahs) are only allowed to pass through and the rest of the compounds are absorbed by the dissolved materials in the bowl water.

According to some embodiments, the filtering product (e.g., effervescent tablet) is made up of the following ingredients: (i) Sodium carbonate, (ii) Sodium Bicarbonate, (iii) Citric acid, (iv) Ascorbic acid, (v) Titanium dioxide nanoparticles, and/or (vi) Cationic surfactant.

According to some embodiments, the filtering product is an effervescent tablet (e.g., a fizzy tablet) that is about 5 grams, wherein the effervescent tablet comprises (and/or consists of): (i) 1.5 grams of $Na_2CO_3$, (ii) 1.5 grams of $NaHCO_3$, (iii) 1.5 grams of $C_6H_8O_7$, (iv) 0.09 grams of CTAB, (v) 0.6 grams of $TiO_2$, and/or (vi) 0.40 grams of $C_6H_8O_6$.

According to some embodiments, the process of tablets dissolution: (i) Citric Acid reaction with Sodium Bicarbonate and/or (ii) Citric Acid reaction with Sodium Carbonate.

According to some embodiments, tablet ingredients which are mainly responsible for tablet dissolution within water bowl (in presence of water) are presented with chemical formulas: (i) C6H8O7+Na2CO3>H2O+CO2+Na3C6H5O7 and/or (ii) C6H8O7+3NaHCO3>3H2O+2CO2+Na3C6H5O7.

According to some embodiments, the process of absorbing metals in hookah smoke (e.g., associated with FIG. 2E) is associated with and/or comprises: (i) Molecular structure of Ascorbic acid (C6H8O6), and/or (ii) Complexion by two ascorbic acid molecules with metal (M).

According to some embodiments, the process of absorbing metals and/or toxins (e.g., associated with FIG. 2D) is associated with and/or comprises: (i) Functionalizing Nanoparticle Titanium Dioxide with a Cationic Surfactant (e.g., CTAB), and/or (ii) Absorption of toxins by TiO2-CTAB.

According to some embodiments, toxic substances in the hookah smoke are absorbed via filtration using the filtering product, and/or only nicotine, tobacco flavor and/or essence remain in the hookah smoke.

Figure 2D:
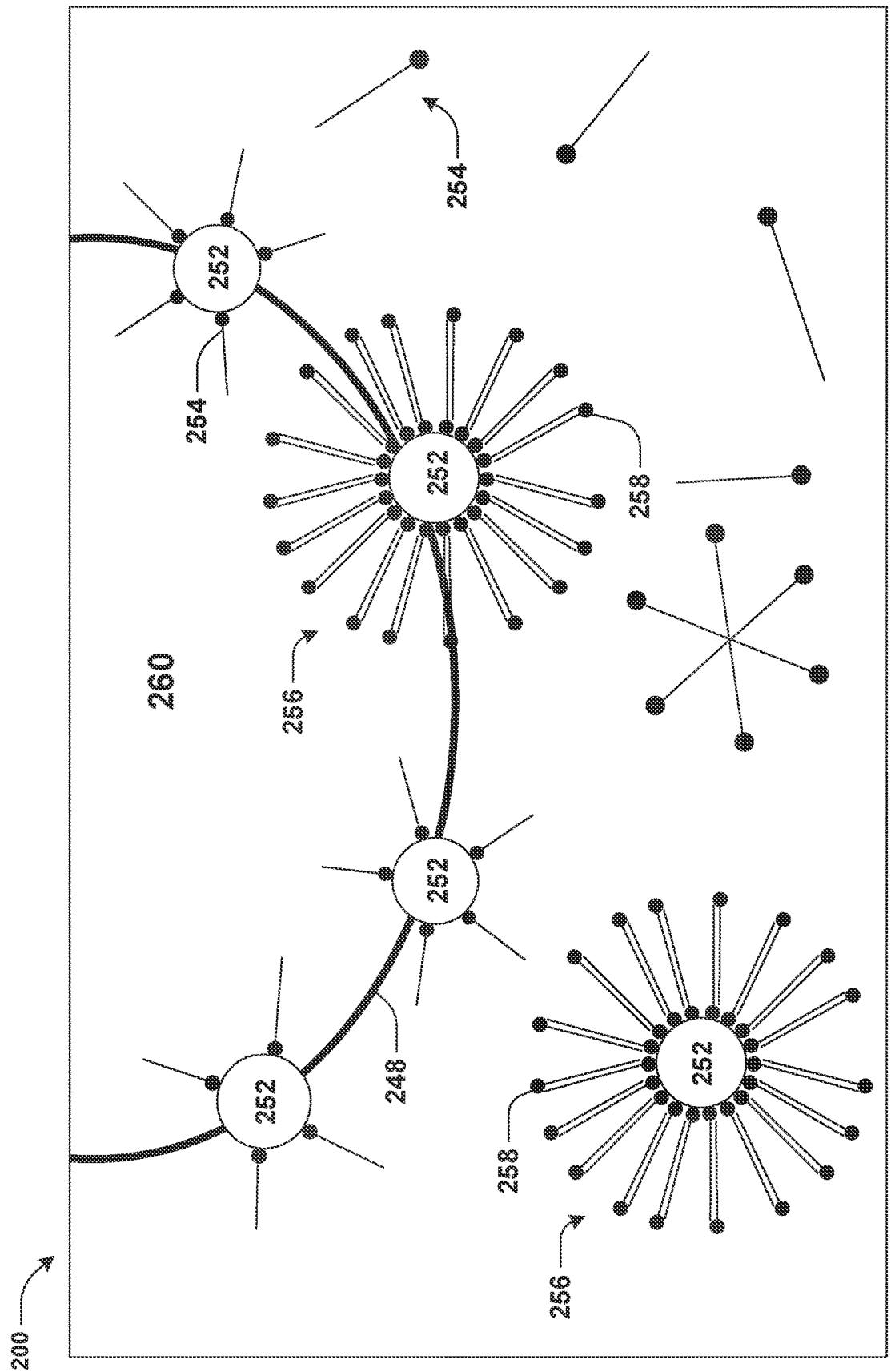
FIG. 2D is an illustration of titanium dioxide ($TiO_2$) nanoparticles interacting with cetyltrimethylammonium bromide (CTAB) (which may also be referred to as cetrimonium bromide) molecules in a mixture, according to some embodiments.
Figure 2E:
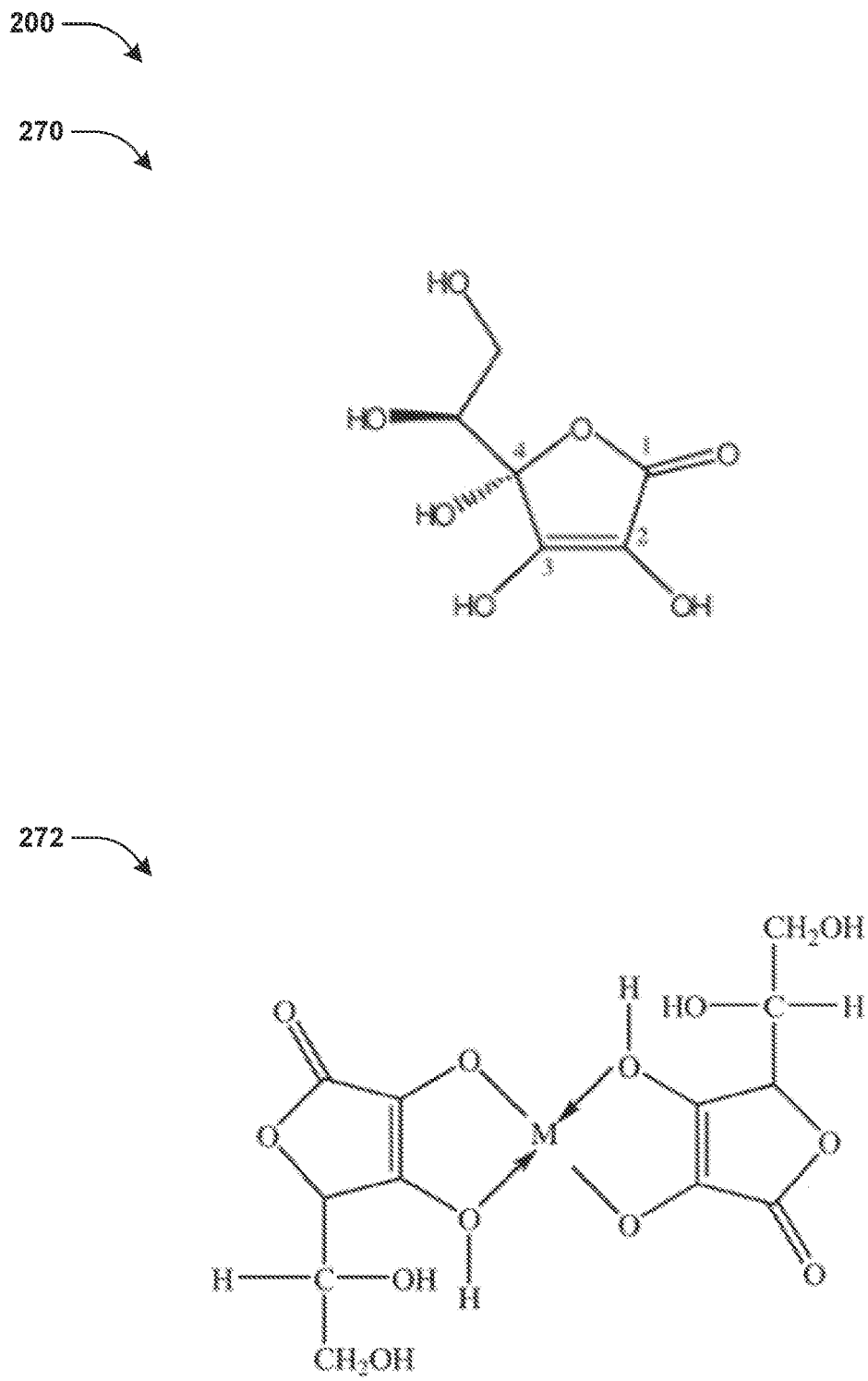
FIG. 2E is an illustration of a molecular structure of ascorbic acid of a filtering product and a metal-organic ligand complex formed using the filtering product, according to some embodiments.

According to some embodiments, FIG. 2D indicates the formulation and chemical process of heavy metals absorption and the formation of the complex by ascorbic acid, wherein the presence of a combination of Nano-titanium dioxide with CTAB has resulted in the formation of charged long-chain and cationic micelles for trapping harmful heterocyclic and amino, which eventually eliminated them with a high-speed synthetic reaction in water bowl.

According to some embodiments, advantageous effects of the present disclosure comprise: (i) Removing toxic substances and chemicals (e.g., most toxic substances and chemicals) in tobacco and/or tobacco smoke, (ii) It is not necessary to attach an external device to hookah, (iii) Filtration without removing nicotine and tobacco taste, and/or (iv) Hookah smoking method is not changed.

According to some embodiments, in order to remove toxic compounds (e.g., most toxic compounds) of hookah tobacco and/or smoke, the smoker needs to drop the tablet in bowl water and then smokes (e.g., smokes without any additional tools). According to some embodiments, this may allow for passing nicotine (e.g., only passing nicotine and/or flavor) in the tobacco and may allow for other compounds to be filtered.

According to some embodiments, the filtering product filters wide range of toxins and chemicals in hookah smoke such as nitrogenous and carcinogenic compounds, amine compounds, and heavy metals. This filtering product is available in tablet form and the smoker drops the effervescent tablet in the hookah water bowl. The tablet is activated in the presence of water and dissolves its compounds in the bowl water.

6. CLAIMS SUMMARY

According to some embodiments, a filtering product is provided. The filtering product includes titanium dioxide; CTAB; and ascorbic acid.

According to some embodiments, a ratio of the CTAB to the titanium dioxide by weight is between about 0.01:1 to about 0.3:1.

According to some embodiments, a ratio of the ascorbic acid to the titanium dioxide by weight is between about 0.3:1 to about 1.4:1.

According to some embodiments, the filtering product includes ionic liquid.

According to some embodiments, the ionic liquid is $BMIM-PF_6$; and a ratio of the ionic liquid to the titanium dioxide by weight is between about 0.05:1 to about 0.4:1.

According to some embodiments, a method for filtering smoke of a water pipe is provided. The method includes: forming, using the filtering product and a liquid, a mixture; and conducting the smoke through a chamber, of the water pipe, containing the mixture, wherein the mixture filters the smoke conducted through the chamber.

According to some embodiments, a method for filtering gas is provided. The method includes: forming, using the filtering product and a liquid, a mixture; and conducting the gas through a chamber containing the mixture, wherein the mixture filters the gas conducted through the chamber.

According to some embodiments, an effervescent filtering product is provided. The effervescent filtering product includes titanium dioxide; CTAB; ascorbic acid; and one or more effervescent agents.

According to some embodiments, the effervescent filtering product is in the form of an effervescent tablet, effervescent powder or effervescent granules.

According to some embodiments, a ratio of the CTAB to the titanium dioxide by weight is between about 0.01:1 to about 0.3:1.

According to some embodiments, a ratio of the ascorbic acid to the titanium dioxide by weight is between about 0.3:1 to about 1.4:1.

According to some embodiments, the effervescent filtering product includes ionic liquid.

According to some embodiments, the ionic liquid is $BMIM-PF_6$; and a ratio of the ionic liquid to the titanium dioxide by weight is between about 0.05:1 to about 0.4:1.

According to some embodiments, the one or more effervescent agents include: one or more acids; and one or more bases.

According to some embodiments, a ratio of the one or more acids to the titanium dioxide by weight is between about 1:1 to about 10:1; and/or a ratio of the one or more bases to the titanium dioxide by weight is between about 1:1 to about 20:1.

According to some embodiments, a method for filtering smoke of a water pipe is provided. The method includes: dissolving the effervescent filtering product in a liquid to form a mixture; and conducting the smoke through a chamber, of the water pipe, containing the mixture, wherein the mixture filters the smoke conducted through the chamber.

According to some embodiments, a method for filtering gas is provided. The method includes: dissolving the effervescent filtering product in a liquid to form a mixture; and conducting the gas through a chamber containing the mixture, wherein the mixture filters the gas conducted through the chamber.

According to some embodiments, a gas filtering system is provided. The gas filtering system includes: a chamber containing a mixture, the mixture including: titanium dioxide, CTAB, and ascorbic acid; and a gas pump configured to pump gas through the chamber, wherein the mixture filters the gas conducted through the chamber.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A filtering product comprising:
   titanium dioxide ($TiO_2$);
   cetyltrimethylammonium bromide (CTAB); and
   ascorbic acid ($C_6H_8O_6$), wherein a ratio of the CTAB to the titanium dioxide by weight is between about 0.01:1 to about 0.3:1.

2. The filtering product of claim 1, wherein:
   a ratio of the ascorbic acid to the titanium dioxide by weight is between about 0.3:1 to about 1.4:1.

3. A filtering product comprising:
   titanium dioxide ($TiO_2$);
   cetyltrimethylammonium bromide (CTAB);
   ascorbic acid ($C_6H_8O_6$); and
   ionic liquid.

4. The filtering product of claim 3, wherein:
   the ionic liquid is 1-Butyl-3-methylimidazolium hexafluorophosphate ($BMIM-PF_6$); and
   a ratio of the ionic liquid to the titanium dioxide by weight is between about 0.05:1 to about 0.4:1.

5. The filtering product of claim 4, wherein:
   a ratio of the CTAB to the titanium dioxide by weight is between about 0.01:1 to about 0.3:1; and
   a ratio of the ascorbic acid to the titanium dioxide by weight is between about 0.3:1 to about 1.4:1.

6. A method for filtering smoke of a water pipe, the method comprising:
   forming, using a filtering product and a liquid, a mixture, wherein the filtering product comprises titanium dioxide (TiO2), cetyltrimethylammonium bromide (CTAB), and ascorbic acid (C6H8O6); and
   conducting the smoke through a chamber, of the water pipe, containing the mixture, wherein the mixture filters the smoke conducted through the chamber.

7. A method for filtering gas, the method comprising:
   forming, using the filtering product of claim 1 and a liquid, a mixture; and
   conducting the gas through a chamber containing the mixture, wherein the mixture filters the gas conducted through the chamber.

8. An effervescent filtering product comprising:
   titanium dioxide ($TiO_2$);
   cetyltrimethylammonium bromide (CTAB);
   ascorbic acid ($C_6H_8O_6$); and
   one or more effervescent agents.

9. The effervescent filtering product of claim 8, wherein the effervescent filtering product is in the form of an effervescent tablet, effervescent powder or effervescent granules.

10. The effervescent filtering product of claim 8, wherein:
a ratio of the CTAB to the titanium dioxide by weight is between about 0.01:1 to about 0.3:1.

11. The effervescent filtering product of claim 8, wherein:
a ratio of the ascorbic acid to the titanium dioxide by weight is between about 0.3:1 to about 1.4:1.

12. The effervescent filtering product of claim 8, comprising:
ionic liquid.

13. The effervescent filtering product of claim 12, wherein:
the ionic liquid is 1-Butyl-3-methylimidazolium hexafluorophosphate (BMIM-$PF_6$); and
a ratio of the ionic liquid to the titanium dioxide by weight is between about 0.05:1 to about 0.4:1.

14. The effervescent filtering product of claim 12, wherein the one or more effervescent agents comprise:
one or more acids; and
one or more bases.

15. The effervescent filtering product of claim 14, wherein at least one of:
a ratio of the one or more acids to the titanium dioxide by weight is between about 1:1 to about 10:1; or
a ratio of the one or more bases to the titanium dioxide by weight is between about 1:1 to about 20:1.

16. A method for filtering smoke of a water pipe, the method comprising:
dissolving the effervescent filtering product of claim 8 in a liquid to form a mixture; and
conducting the smoke through a chamber, of the water pipe, containing the mixture, wherein the mixture filters the smoke conducted through the chamber.

17. A method for filtering gas, the method comprising:
dissolving the effervescent filtering product of claim 8 in a liquid to form a mixture; and
conducting the gas through a chamber containing the mixture, wherein the mixture filters the gas conducted through the chamber.

* * * * *